(12) United States Patent
Jones et al.

(10) Patent No.: US 8,370,372 B2
(45) Date of Patent: Feb. 5, 2013

(54) METHOD AND SYSTEM OF PROMOTING HUMAN-ASSISTED SEARCH

(76) Inventors: Scott A. Jones, Carmel, IN (US); Mark Gamache, Zionsville, IN (US); Thomas E. Cooper, Indianapolis, IN (US)

( * ) Notice: Subject to any disclaimer, the term of this patent is extended or adjusted under 35 U.S.C. 154(b) by 582 days.

(21) Appl. No.: 12/265,288

(22) Filed: Nov. 5, 2008

(65) Prior Publication Data

US 2009/0119263 A1    May 7, 2009

Related U.S. Application Data

(60) Provisional application No. 60/985,435, filed on Nov. 5, 2007.

(51) Int. Cl.
*G06F 7/00* (2006.01)
*G06F 17/30* (2006.01)

(52) U.S. Cl. .................................. 707/758; 707/706

(58) Field of Classification Search ........................ None
See application file for complete search history.

(56) References Cited

U.S. PATENT DOCUMENTS

| | | | |
|---|---|---|---|
| 6,278,993 B1 | 8/2001 | Kumar et al. | |
| 6,564,222 B1 | 5/2003 | Sassano | |
| 6,601,061 B1 | 7/2003 | Holt et al. | |
| 6,938,068 B1 * | 8/2005 | Kraft et al. | 709/203 |
| 7,065,500 B2 | 6/2006 | Singh et al. | |
| 7,113,939 B2 | 9/2006 | Chou et al. | |
| RE39,486 E | 2/2007 | Cleron et al. | |
| 7,257,577 B2 | 8/2007 | Fagin et al. | |
| 7,664,770 B2 * | 2/2010 | Jackson et al. | 707/706 |
| 7,747,613 B2 * | 6/2010 | Freeman et al. | 707/722 |
| 7,788,128 B2 * | 8/2010 | Robinson et al. | 705/14.2 |
| 7,930,286 B2 * | 4/2011 | Sue | 707/706 |
| 2002/0010715 A1 * | 1/2002 | Chinn et al. | 707/514 |
| 2002/0069194 A1 * | 6/2002 | Robbins | 707/3 |
| 2003/0002445 A1 * | 1/2003 | Fullana et al. | 370/241 |
| 2003/0004909 A1 * | 1/2003 | Chauhan et al. | 706/45 |
| 2003/0163356 A1 * | 8/2003 | Marks et al. | 705/7 |
| 2004/0061720 A1 * | 4/2004 | Weber | 345/760 |
| 2006/0129931 A1 | 6/2006 | Simons et al. | |
| 2006/0206454 A1 | 9/2006 | Forstall et al. | |
| 2006/0265232 A1 | 11/2006 | Katariya et al. | |
| 2006/0271537 A1 | 11/2006 | Chandrasekharan et al. | |
| 2006/0294134 A1 | 12/2006 | Berkhim et al. | |
| 2007/0100798 A1 | 5/2007 | Kapur | |
| 2007/0168331 A1 | 7/2007 | Reddy et al. | |
| 2007/0174350 A1 | 7/2007 | Pell et al. | |
| 2007/0185841 A1 | 8/2007 | Jones et al. | |
| 2007/0203887 A1 | 8/2007 | Dynin | |
| 2008/0201304 A1 * | 8/2008 | Sue | 707/3 |
| 2010/0169338 A1 * | 7/2010 | Kenedy et al. | 707/758 |

OTHER PUBLICATIONS

International Search Report issued on Nov. 28, 2008 in corresponding International Patent Application PCT/US 08/82474.

* cited by examiner

*Primary Examiner* — Khanh Pham
*Assistant Examiner* — Azam Cheema

(57) ABSTRACT

A method and system of promoting service(s) of a search system are disclosed. A monitoring software or a search monitor may be operative on a user device. A user may be notified of an alternate search result(s) when such a result is identified. Condition(s) whereby a notification is presented to a user may be modified based on user action(s) and/or other information.

20 Claims, 22 Drawing Sheets

SEARCH MONITOR LOG RECORD 600

| | Description | Example Content |
|---|---|---|
| 605 | Search Monitor ID | 'chachahelper 1000' |
| 610 | URL List | 'http://www.website1.com'; 'http://www.dogpile.com' |
| 615 | User Actions | 'select book mark 'http://www.dogpile.com''; 'type 'who is brown leaves?' in search box'; 'left click on 'search' button'; 'right click on 'Operation Brown Leaves'; 'select 'open in new tab'' |
| 620 | Time Stamp | URL:'22.15.06.12.08.2007','22.17.10.12.08.2007'; Actions:'22.16.45.12.08.2007','22.16.52.12.08.2007'; '22.17.09.12.08.2007','22.17.35.12.08.2007'; '22.17.36.12.08.2007' |
| 625 | Auxiliary Information | link:;'www.space.com';'www.science.com'; folder name:'science sites' |

FIG. 6

SEARCH MONITOR USER RECORD

| | Description | Example Content |
|---|---|---|
| 705 | Search Monitor ID | 'chachhelper 1000' |
| 710 | Query ID | 'who is brown leaves?'; 'what is the best Italian restaurant in downtown Chicago?' |
| 715 | Searcher ID | 'Paula 1126'; 'Sergei1 1000'; |
| 720 | Search Engine | 'www.dogpile.com'; 'www.ask.com' |
| 725 | Rating | '9';'A-12' |

FIG. 7

SEARCHER RECORD 800

| | Description | Example Content |
|---|---|---|
| 805 | Searcher ID | 'Paula 1126' |
| 810 | Keyword ID | 'brown leaves'; 'the best site for the Green Party'; 'Whales at Sea World' |
| 815 | Category ID | 'Arts>Music'; 'Polititcs>Charity' |
| 820 | Results ID | 'www.brownleaves.jp'; 'www.getgreennow.org'; 'www.freethewhales.net' |
| 825 | Query ID | 'who is brown leaves?'; 'what is the best site for the Green Party?'; 'how can I help whales at SeaWorld?' |
| 830 | Searcher ratings | 1;3;2 1;7/13 |

QUERY RECORD

| | Description | Example Content |
|---|---|---|
| 905 | Query ID | 'who is brown leaves?' |
| 910 | Keyword ID | 'brown';'leaves';'brown leaves' |
| 915 | Category ID | 'Home>Gardening'; 'Arts>Music' |
| 920 | Results ID | 'www.brownleaves.jp'; 'www.science.org\leafscience'; 'www.amazon.com\brownleaves'; 'www.gardening.com'; |
| 925 | User ID | 'chachahelper 1000' |
| 930 | Searcher ID | 'Paula 1126'; 'TomC 1023' |
| 935 | Search Engine ID | 'www.dogpile.com'; 'www.dogpile.com' |

KEYWORD RECORD

| | Description | Example Content |
|---|---|---|
| 1005 | Keyword ID | 'brown leaves' |
| 1010 | Category ID | 'Home>Gardening'; 'Arts>Music' |
| 1015 | Searcher ID | 'TomC 1023', 'Sergei1 1000'; 'Paula 1126' |
| 1020 | Category rating | 1;2 |
| 1025 | Searcher rating | 1;3;2 |

CATEGORY RECORD

| | Description | Example Content |
|---|---|---|
| 1105 | Category ID | 'Arts>Music'; |
| 1110 | Searcher ID | 'TomC 1023', 'Sergei1 1000'; 'Paula 1126' |
| 1115 | Searcher rating | 3;2;1 |

ChaCha
search > brainpower

Web | News | Images | Video | Audio
Who is Brown Leaves? — 1560
Need help? Search with a Guide ChaCha Search — 1565    Guided Search — 1570

1575 — 12 Guides Available for Arts>Music

Top 8 pages of Web results selected for    Who is Brown Leaves?    1 2 3 4 5 6 7 8 Next>>

Related Searches

Brown Leaf — 1555
Why Do Leaves Turn Brown?
Why Are My Plants Turning Brown
Lilac Brown Leaves

Brown Leaves – Alternate Jazz-Techno Music — 1557
Blend of Techno and Jazz makes us fans
http://www.brownleaves.jp ChaCha
WebGems™

Amazon.com: Danitra Brown Leaves Town: Books: Nikki Grimes, Floyd ...
Amazon.com: Danitra Brown Leaves Town: Books: Nikki Grimes, Floyd Cooper by Nikki Grimes, Floyd Cooper.
http://www.amazon.com/Danitra-Brown-Leaves-Nikki-Grimes/d...

Brown Tips on Houseplant Leaves
Leaves begin to dry, and as they do, the tips of the leaves turn brown. Next the margins of the leaves turn brown. Later, the lower leaves become yellow and ...
http://ag.arizona.edu/gardening/news/azdaily/star/brown_ti...

The Brown Leaves Country Hotel
Open all year, The Brown Leaves Country Hotel offers true value for money in the form of comfortably furnished en suite rooms with all the facilities ...
http://www.brownleavescountryhotel.co.uk/

NBA.com Utah's Brown Leaves After Okur Lands on Him
Utah's Brown leaves game after ... Utah's Brown Leaves After Okur Lands on Him. Posted May _ 9 (AP) — Utah rookie Dee Brown injured his neck when teammate ...

Sponsored Links

Leaf
Compare prices on retail products. Find online merchants.
Sponsored By http://PriceGrabber.com
Ads by Yahoo!

Free Shipping on Orders $100 or More
All Kinds of Unique Gift & Gift Basket Ideas! Handmade & Personalized.
Sponsored By http://usagiftsandbasket.___
Ads by Yahoo!

Leaves
Save Money. Find All That You Need. Save on What You Are Looking For.
Sponsored By http://www.become.com
Ads by Yahoo!

Leaves
Improve Academic Skills. All Levels Online Tutoring and Homework Help.
Sponsored By
http://www.TutorVista.com

FIG. 17

```
<script src="/extern_js/f/CgJlbhICdXMrMAc4ACw/ErQnJTrFThw.js"></script>
```
↑1805  ↑1810

```
<table border=0 cellpadding=0 cellspacing=0 width=100% class="t bt"><tr><td align=right nowrap><font
size=-1>Results <b>1</b> - <b>10</b> of about <b>17,500,000</b> for <b><a
href="/url?sa=X&oi=dict&ei=pUIKR7PGHZeSiwH4ku3HCQ&sig2=YqhgXm0cxDuEIOomX8qx9Q&q=http://
www.answers.com/brown%26r%3D67&usg=AFQjCNFCXYXsVB6p5uGX95hEiv6vk-7DYQ" title="Look up definition of
brown">brown</a> <a
href="/url?sa=X&oi=dict&ei=pUIKR7PGHZeSiwH4ku3HCQ&sig2=2vbGQOuftLdPcdAnlnICMA&q=http://
www.answers.com/leaves%26r%3D67&usg=AFQjCNG97EQ8bwd-R7tXIjRbLxFwObDnsA" title="Look up definition
of leaves">leaves</a></b>.  (<b>0.26</b> seconds) </font></td></tr></table>
```
↑1815  ↑1820

```
<div id=res>
```
↑1835

```
<div><div class=g><h2 class=r><a
href="http://ag.arizona.edu/gardening/news/azdailystar/brown_tips.html" class=l onmousedown="return
clk(this.href,'','res','1','&sig2=kv9CNAy0BKONDoYLTKxzIg')"><b>Brown</b> Tips on Houseplant
<b>Leaves</b></a></div>
```
↑1825  ↑1830

```
    <div id="logoHome">
        <img src="/images/logos/new_home_logo.png" alt="ChaCha: search + brainpower" width="253"
height="121" />
    </div>
```
↑1840

METHOD AND SYSTEM OF PROMOTING HUMAN-ASSISTED SEARCH

CROSS-REFERENCE TO RELATED APPLICATIONS

This application is related to and claims the benefit of U.S. Provisional Application Ser. No. 60/980,049, inventor Scott A. Jones, et al., titled METHOD AND SYSTEM FOR IMPROVING RELEVANCE OF SEARCH RESULTS, filed Oct. 15, 2007 and U.S. Provisional Application 60/985,435 inventor Scott A. Jones, et al., titled method and system for PROMOTING HUMAN-ASSISTED SEARCH filed Nov. 5, 2007.

BACKGROUND

1. Field

The present invention is related to search engine technologies including human-assisted search engines and, more particularly, to integrating a human-assisted search with other applications in order to promote usage of the search system.

2. Description of the Related Art

Generally, search systems supply a user with a toolbar or other helper application in order to assist the user in more effectively utilizing a search system. Such an add-in or extension may be integrated with a web browser in order to produce a common look and feel with the web browser. A web browser may allow a user to designate a default search engine for the browser when a search query is entered, or a user enters a uniform resource locator (URL) in the address bar.

Toolbar extensions have been implemented by search engine companies such as Yahoo!®, Google®, and others in order to promote usage of search services. However problems exist with using a toolbar for promotional purposes. The presence of multiple toolbars may cause information overload for the consumer. In addition, the user may have a preferred default search system, and not desire to have an added toolbar from a competitive search system taking up useful space in a display.

In addition, presence of a 'pop-up', interstitial or other advertisement page which is not desired may be annoying to a user. As a result, there is a need for a method and system of promoting a human-assisted search service which is integrated with other applications.

SUMMARY

The disclosed system and method include receiving a search request, determining whether a search result pertaining to the search request is available and providing an indication of the search result based on the determining.

The disclosed method promotes a search service including by determining whether a result related to a request is available responsive to detection of receipt of the request and inserting an indication of the result within information provided as a response to the request.

The method and system disclosed obtains a result from an application separate from a browser providing the information.

A system embodiment, methods, data structures and interfaces for operating the embodiments are disclosed.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 6 illustrates a search monitor log record.
FIG. 7 illustrates a search monitor user record.
FIG. 8 illustrates a searcher record.
FIG. 9 illustrates a query record.
FIG. 10 illustrates a keyword record.
FIG. 11 illustrates a category record.
FIGS. 15A-15C illustrate exemplary graphical user interfaces (GUI's) for a user.
FIG. 17 illustrates an exemplary web page.

DETAILED DESCRIPTION OF THE PREFERRED EMBODIMENTS

Figure 1:
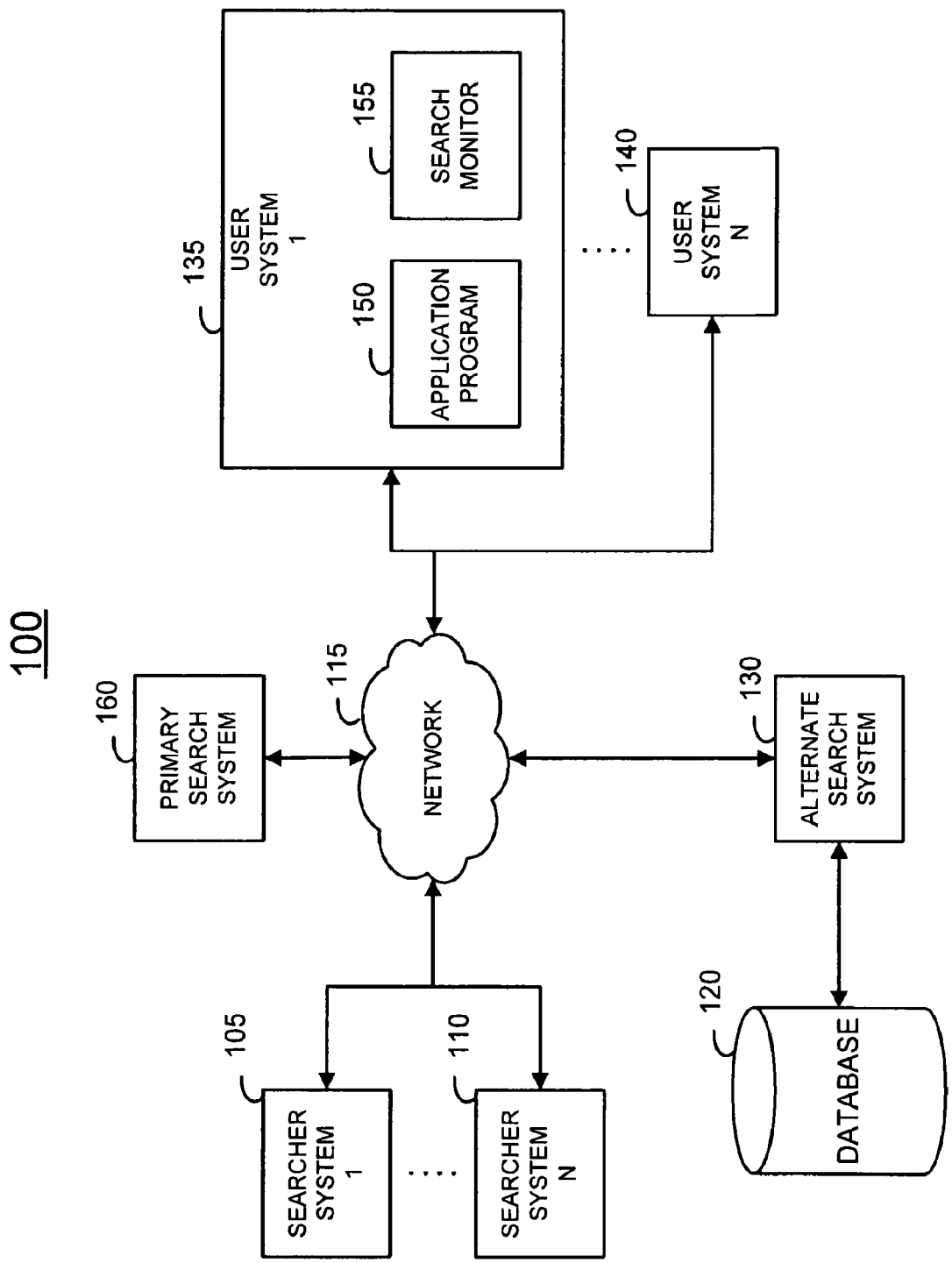
FIG. 1 is a block diagram illustrating a system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

To promote the services of a search system, an extension and/or a service is installed on a user system. The extension or service may monitor action(s) of a user to determine if a search request is submitted. If a search request is detected, the search monitor may submit the search request to an alternate search service which may utilize the assistance of one or more human assistants or 'guides'. The extension and/or service may be referred to as a 'search monitor'.

The disclosed method and system includes an application, an extension or other software which monitors activity of a user or 'search monitor'. When a user conducts a search, a search monitor may send a search request to an alternate search engine, such as a human-assisted search system. When a request is received by a search system, the search database is reviewed using content of a search request and a search monitor is notified if a search result has been identified which may be superior to a result(s) produced by a search system identified by the search monitor. A search monitor may notify a user that a search result is available and/or that a searcher in a related topic is available. User response to a notification may be monitored by a search monitor. A search monitor may send a request to a search system responsive to a user action.

Search monitor behavior may be modified based on information obtained by a search system. For example, if a user declines the service(s) of a human-assisted search system, a search monitor may cease to present notifications to a user. In this way, the services of a human-assisted search system maybe promoted without annoying a user with a notification which may be unwanted or irrelevant. A notification which is integrated with an application is presented to a user if an alternate result is available. The notification is integrated with one or more applications, and does not require a user to take specific actions to obtain information of the results provided by an alternate search service.

A search monitor may compare a search result(s) provided by an alternate search system to a search result(s) provided by a primary or default search system. If it is determined that a search result(s) is available from an alternate search system which has been determined to be superior to the search result(s) provided by the primary search system, the search monitor may provide a notification to a user of the alternate search result(s).

If it is determined that a search result(s) responsive to a query which is judged to be superior to that produced by a primary search system is not available, the query or search request may be submitted to a human searcher or guide who may provide a search result(s) responsive to the search request. If a searcher produces a search result(s), a user who submitted a query may be notified that a human selected response to the search request is available.

An indication of the presence of an alternate search result(s) may be presented in various ways. In at least one embodiment, an indication may be presented within the rendering of information in a browser window such that it is integrated with a search result(s) which are presented from a primary search system. In other embodiments, an indication may be provided in a toolbar and/or other area outside the browser window or other application rendering window. In other embodiments, may be provided as a 'pop-up', an interstitial window, or an indication in a border area of a user display such as the 'service tray' in a Windows® operating system environment.

As illustrated in FIG. 1, in at least one embodiment, system 100 is provided. The system 100 includes a searcher system 105, 110, a network 115 such as the Internet, an alternate search system 130, a user system 135, 140, a database 120, which may comprise various records, an application program 150, and a search monitor 155, of which one or more may be resident in any user system, such as the user systems 135, 140, and a primary search system 160.

Each of the searcher systems, that is, the searcher systems 105, 110 can be operated by a human searcher or 'guide' or 'searcher', who may be any person, to obtain search result(s) and/or other information for an information seeker located at user systems (e.g., the user system 135, 140). While only a limited number of searcher and user (also referred to as an information seeker or requester) systems are depicted in FIG. 1, it is within the scope of the disclosure for multiple searcher and user systems to be utilized.

The network 115 (FIG. 1) may be a global public network of networks (the Internet) and/or consist in whole or in part of one or more private networks and communicatively couples the searcher systems 105, 110 and user systems with the other components of the system such as the alternate search system 130, and the database 120.

The alternate search system 130 allows interaction to occur between the searcher systems 105, 110 and the user systems 135, 140. For example, an information search query(ies) can be transmitted from the user system 135, 140 to the alternate search system 130, where a query(ies) can be accessed by the searcher systems 105, 110. Similarly, a search result(s) produced using the searcher systems 105, 110 in response to a search query(ies) produced by the user system 135, 140 are transmitted to the alternate search system 130, where they may be stored by the alternate search system 130 and may be transmitted to the user systems 135, 140.

The user systems 135, 140 may be operated by any person or entity and may include within the scope of the disclosure, any device through which an information seeker can submit a query to and/or receive a result(s) from the alternate search system 130. In one embodiment, the user system 135 may be a device configured for connection to a network and may run web browser software. Thus, the user system 135 may be a laptop, personal data assistant, desktop PC or Mac®, a workstation or terminal connected to a mainframe, or a smart phone, etc. within the scope of the disclosure. The alternate search system 130 may include a gateway for voice communication, a speech-to-text system or other transcription device and/or personnel to facilitate access to the alternate search system 130 via voice communications such as through a land line phone, cellular phone, Voice Over Internet Protocol (VoIP) or other telephonic devices. Such devices may also be user systems 135 within the scope of the disclosure.

The user systems 135, 140, the searcher systems 105, 110, and the alternate search system 130 may include equipment and personnel required to send and/or receive messages between a user system, a guide system, a resource system and/or the search system using the network 115. For example, a guide system(s) may be utilized for speech-to-text transcription, a user system may include text-to-speech conversion capabilities, or automated conversion of text to speech or speech to text may be performed. The database 120 may include information which may allow the alternate search system 130 to establish communication between the other elements of the system. Likewise the alternate search system 130 may include hardware and/or software which may allow a user to submit a search request using communication services such as Instant Messaging (IM), or text messaging such as Short Messaging Service (SMS), Enhanced Messaging Service (EMS), Multimedia Messaging Service (M MS) and/or other types of messaging services.

The alternate search system 130 is communicatively coupled with the database 120. As will be described herein in further detail below, the database 120 includes data that is processed in association with operation(s) of the embodiments. Although FIG. 1 illustrates the database 120 as a separate component of the system, the database 120 may be integrated with the alternate search system 130. Further, the records maintained in the database 120 may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100.

A user system, a guide system, and/or a resource system may be a desktop or laptop PC or Mac®, a mobile phone, a smart phone, a PDA, a server system, a landline phone, a specialized communication terminal, a terminal connected to a mainframe, or any other communication device. The alternate search system 130 may include one or more servers, computers, etc. After being presented with the disclosure herein, one of ordinary skill in the relevant art will immediately realize that any viable computer system(s) or communication device(s) known in the art may be used as user systems, guide systems, resource systems, and/or to implement the alternate search system 130 and/or the primary search system 160

The primary search system 160 may be any search system which may receive a user search request from a user system such as the user systems 135, 140 using the network 115. While only one primary search system 160 is depicted in FIG. 1, it is within the scope of the disclosure for multiple primary search systems 160 to be utilized.

The application program 150 may be any software application(s) which may operate on a user system such as the user system 135. In at least one embodiment the application program 150 may be a web browser application such as Firefox®, Microsoft Internet Explorer®, Safari® or applications such as Adobe Photoshop, OpenOffice, GIMP, and/or other applications which may be extended. Multiple application programs 150 may be operative on the user system 135.

The search monitor 155 may be an extension which interfaces with the application program 150. Alternately, the search monitor 155 may be a service which is operative on the user system 135. The search monitor 155 may be installed and/or started in any suitable way. For example, the search monitor 155 may be downloaded from a server such as a server associated with the alternate search system 130, or the search monitor 155 may be pre-installed on a user system, or the search monitor 155 may be loaded from any storage media such as Flash Memory, CD-ROM, DVD-RW or other storage media well known in the art. The search monitor 155 may provide a unique identifier (ID) which may be associated with a message(s) sent by the search monitor 155. A unique identifier may allow the alternate search system 130 to identify a message(s) associated with the search monitor 155. The search monitor ID may be used for various purpose(s). For example, a search monitor behavior may be modified based on a search monitor ID and/or any information included in the database 120 and/or information resident in the user system 135. Operation of a search monitor such as the search monitor 155 will be described further herein below.

The primary search system 160 may be any search system which may receive a user search request and respond to the request using the network 115. For example the primary search system 160 may be a search engine service such as Google®, Ask®, and/or any other search system.

The search monitor 155 may monitor activity of a user of the user system 135 to determine if a user submits a search request to a search system, such as the primary search system 160. If such a request is detected from for example the application program 150, the search monitor 155 may respond to such a request as described further herein below.

Figure 2:
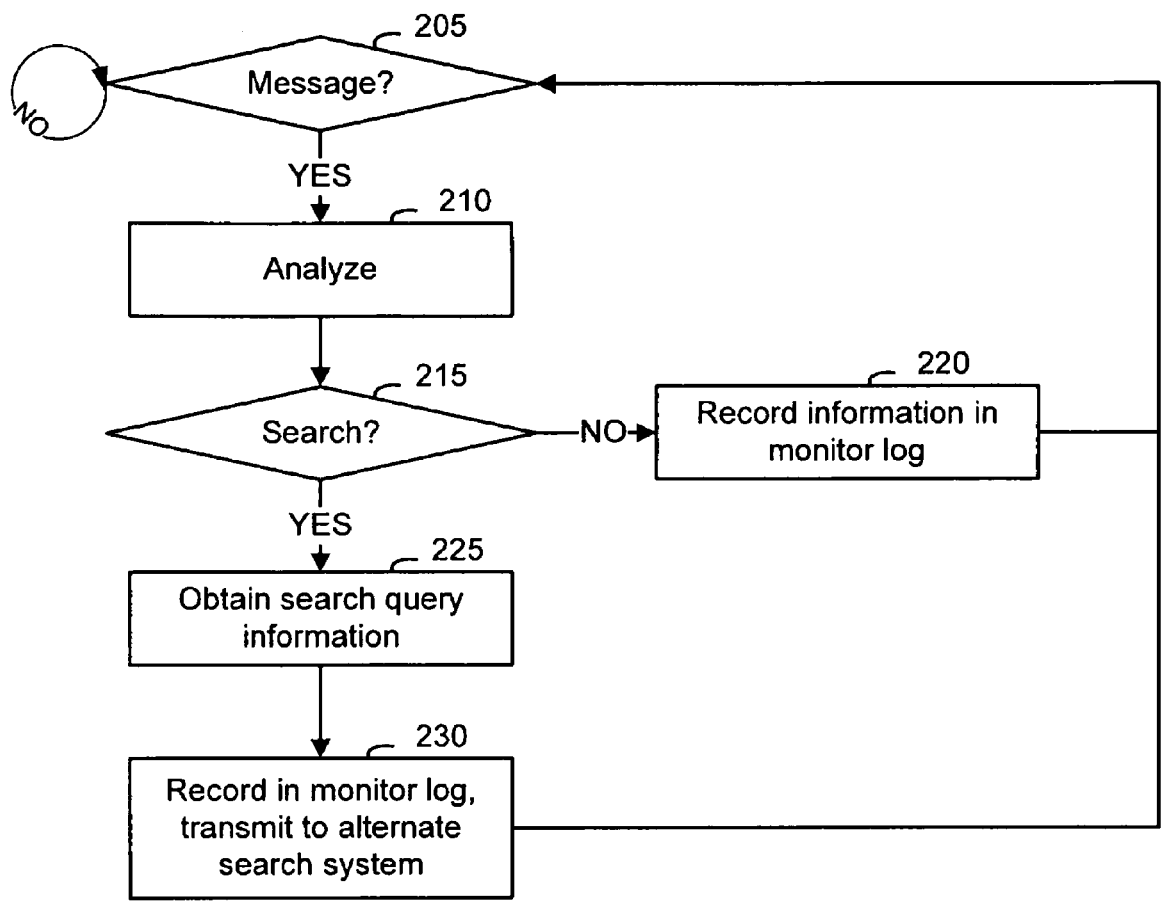
FIG. 2 is a flow diagram of a process for parsing a message.

As illustrated in FIG. 2, a process 200 for analyzing a message is provided. In operation 205, a determination is made as to whether a new message (URL) has been detected. If in operation 205 it is determined that a new message has not been detected, control remains at operation 205. If in operation 205 it is determined that a new message has been detected, control is passed to operation 210 and process 200 continues. The determination in operation 205 may made based on information obtained by, for example, the search monitor 155 (FIG. 1). The search monitor 155 may obtain such information within the framework of the application program 150, or via the operating system of the user system 135.

Figure 3:
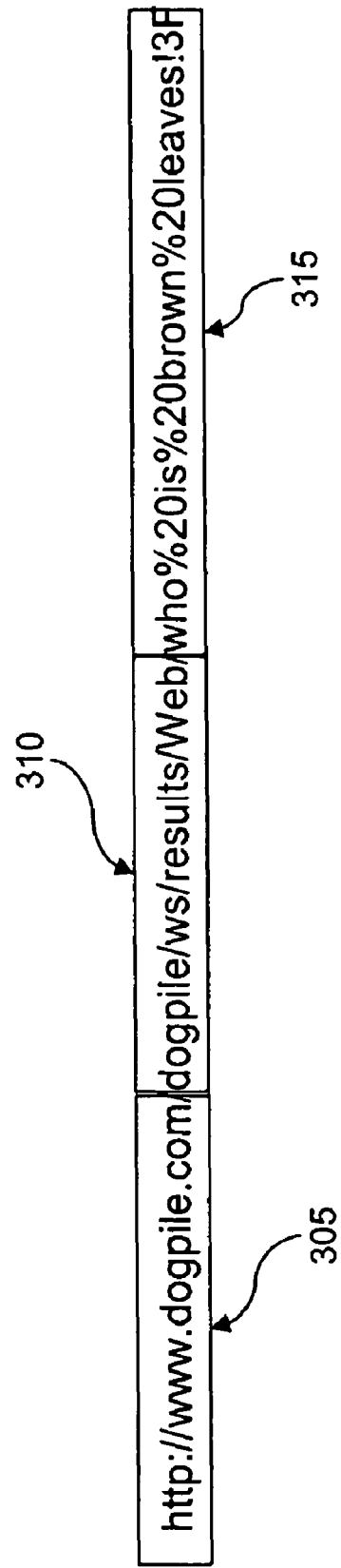
FIG. 3 illustrates an exemplary URL of a search request.

In operation 210 the message detected in operation 205 is analyzed (parsed). For example, a parsing operation may be performed on a URL obtained by the search monitor 155 (FIG. 1) to detect characters within the URL which identify a parent URL as illustrated in FIG. 3. Control is passed to operation 215 and process 200 continues.

In operation 215 a determination is made as to whether a message contains or matches a search request. If in operation 215 it is determined that a message does not contain or does not match a search request, control is passed to operation 220, and process 200 continues. If in operation 215 it is determined that a message does contain a search request, control is passed to operation 225 and process 200 continues.

The determination in operation 215 may be made using various criteria. In at least one embodiment, a parent of a URL indicated in a message is compared to a list of URLs to determine if the URL matches a URL corresponding to a search engine such as the primary search engine 160 (FIG. 1) and if the parent URL matches a URL in the list, it is determined that the message contains a search request. Alternately, an IP address associated with a message, or an IM credential, or an email address, or any other content of a message might be examined in order to determine whether a message contains a search request.

In operation 220 a URL(s), a time stamp(s), user action(s) and/or other information may be obtained and/or recorded in a search monitor log. Control is passed to operation 205 and process 200 continues. A search monitor log may be maintained in storage media of the user system 135 (FIG. 1), may be transmitted to an external storage via the network 115, and/or may be otherwise recorded. Exemplary content of a search monitor log will be further described herein with respect to FIG. 6.

In operation 225 keywords and/or other elements of a message associated with a search request may be parsed according to a format based at least in part on information which was identified in operation 215. Keywords and/or other elements of a search request may be extracted from a message. A message may be prepared and transmitted to the alternate search system 130 (FIG. 1).

In operation 230 a URL(s), a time stamp(s), user actions and/or other information may associated with a message are recorded in a search monitor log. Any or all of a search monitor log may be transmitted to a system(s), such as the alternate search system 130. In at least one embodiment, information associated with a monitor log may be transmitted to the alternate search system 130 (FIG. 1). For example, a message including an identifier of the search monitor 155, a query(s), and an identifier of a primary search system may be transmitted to the alternate search system 130. Control is passed to operation 205 and process 200 continues.

The process 200 may be performed by for example the search monitor 155 (FIG. 1), and/or may be performed by software operative on any suitable device(s) in the system 100. Any operation in the process 200 may be performed by software operating on any device in the system 100. For example, a service might transmit a duplicate of a message transmitted by an application operative on the user system 135 to a server associated with the alternate search system 130, which may perform any or all of the operations of the process 200. Preferably, the process 200 is implemented by the search monitor 155 and is operative on the user system 135.

An exemplary search request is illustrated in FIG. 3. While a URL is used for the purposes of illustration, other types of data might be analyzed in a similar manner to extract information regarding a message which may be used to determine whether a message includes a search request and/or the content of a request. As illustrated in FIG. 3, the search request URL 300 may include a parent URL section 305 (i.e., 'http://www.dogpile.com/'), an additional information section 310 (i.e., 'dogpile/ws/results/Web/'), which may for example describe a web page and/or generate dynamic content, identify information which may be used to select a search vertical, etc. and a search query information section 315 (i.e., 'who%20is%20brown%20leaves!3F'). The parent URL section 305 may be used to identify a domain name including one associated with a service. The additional information section 310 may be blank, or may be used to provide information to a search engine regarding a request. The search query section 315 includes information of a search query string. The example in FIG. 3 is provided to illustrate the content of a search request message. A search request URL may be represented using any methods which are well known in the relevant art.

Figure 4:
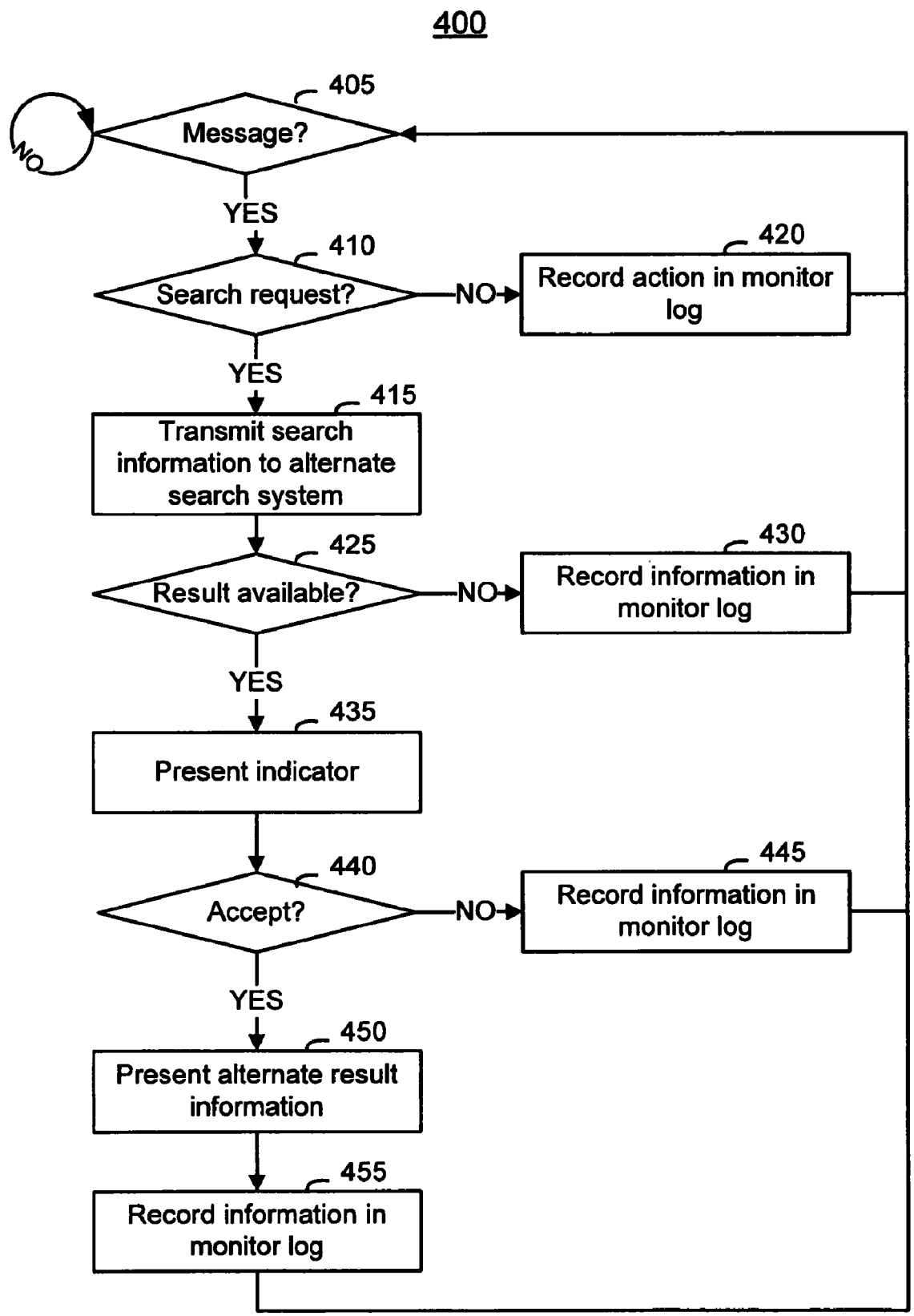
FIG. 4 is a flow diagram of a process for responding to a search request(s).

As illustrated in FIG. 4, a process 400 for providing a search result(s) to a user system is provided. The process 400 may be operative on the user system 135.

In operation 405 a determination is made as to whether a message is detected. If in operation 405 it is determined that a message is not detected, control remains at operation 405 and process 400 continues. If in operation 405 it is determined that a message is detected, control is passed to operation 410 and process 400 continues.

In operation 410 a determination is made as to whether a search request is sent to a search system(s) such as the primary search system 160 (FIG. 1). If in operation 410 it is determined that a search request is not sent, control is passed to operation 420 and process 400 continues. If in operation 410 it is determined that a search request is sent, control is passed to operation 415 and process 400 continues.

The determination in operation 410 may be based on a process such as the process 200 (FIG. 2). The determination in operation 410 may be made based on various criteria. For example, a URL may be compared to a list of search engine URLs. Information may be sent to a system associated with the alternate search system 130 (FIG. 1) which may examine the information to determine if it includes a search request. In at least one embodiment, the search monitor 155 compares a parent of a URL obtained from the application program 150 to a list of a number of URLs to determine if a search request is sent.

In operation 420 a URL(s), a time stamp(s), and/or other information may be recorded in a search monitor log. In at least one embodiment, the search monitor 155 (FIG. 1) may maintain such a log in memory or other storage media accessible from the user system 135. Some or all information of a search monitor log may be transmitted to the alternate search system 130 via the network 115. Information indicated in a search monitor log may include a unique identifier of the search monitor 155. The database 120 is updated. Control is passed to operation 405 and process 400 continues.

In operation 415 a message(s) is transmitted from a system such as the user system 135 (FIG. 1) to a system such as the alternate search system 130. In at least one embodiment, a request which is related to a search request submitted by a user of the user system 135 to a system such as the primary search system 160 is sent to the alternate search system 130. Any or all elements of a search monitor record may be transmitted to the alternate search system 130 via the network 115.

A transmitted message(s) may include one or more of a list of a number of URL's, time information, a keyword(s), a category, a search query, information of an activity(ies) of a user, information associated with a user system such as location information or any other information which may be indicated in a search monitor log. A message(s) may be received from the alternate search system 130 and/or the primary search system 160, and/or any other device(s). The database 120 is updated. Control is passed to operation 425 (FIG. 4) and process 400 continues.

In operation 425 a determination is made as to whether an alternate search result(s) is available. If in operation 425 it is determined that an alternate search result(s) is not available, control is passed to operation 430 and process 400 continues. If in operation 425 it is determined that an alternate search result is available, control is passed to operation 435 and process 400 continues.

The determination in operation 425 may be made based on various criteria. In at least one embodiment, the determination may be made based on content of a message(s) received from the alternate search system 130 (FIG. 1) responsive to a message transmitted in operation 415. A message transmitted by the alternate search system 130 may be examined including relative to, for example, other result(s) to determine if an alternate search result(s) is available. Alternately, a message(s) may be received and/or analyzed from a device(s), such as the searcher system 105 (FIG. 1), the primary search system 160, etc. Content of a message(s) received from the primary search system 160 may be compared to content of a message(s) received from the alternate search system 130 to determine if an alternate search result(s) is available. For example, a message(s) from the alternate search system 130 may indicate that a number of search results are available, or a message(s) received from the primary search system 160 and a message(s) received from the alternate search system 130 may be processed to identify one or more search result(s) which may be compared to determine if an alternate search result(s) is available. In at least one embodiment, a search request may be transmitted to a guide selected to respond to the request, and receipt of a search result from a guide(s) may determine if a search result is available.

In operation 430 (FIG. 4) a URL(s), a time stamp(s), and/or other information may be recorded in a search monitor log. Any or all information of a search monitor log may be transmitted to the alternate search system 130 via the network 115. Information in a search monitor log may include a unique identifier of the search monitor 155. A search monitor log may include information determined based on a response(s) from the primary search system 160. For example, if a search result(s) is provided by the primary search system 160, it may be compared to a search result(s) provided by the alternate search system 130. Information based on such a comparison which may have been used to determine if an alternate search result(s) is available may be indicated in a search monitor log. A search monitor log may include any information within the scope of the embodiments herein. Information of user action (s) responsive to a message(s) received from the primary search system 160, and/or any other data presented to a user including independent of a result may be recorded in a search monitor log. For example, information viewed, time information, etc. may be recorded. Information of a search query, a search result(s) and user action(s) may for example be used to determine a rating of a primary search system. The database 120 is updated. Control is passed to operation 405 (FIG. 4) and process 400 continues.

In operation 435, an indication of an alternate search result(s) may be presented to a user. The presentation of an alternate result is preferably integrated into the user interface of the application program 150. For example, a message interface such as the GUI 1500 illustrated in FIG. 15A may be presented. A process for presenting such an indication is further described herein below with respect to FIG. 16, FIG. 17 and FIG. 18. Any type of indication may be provided within the scope of the embodiments disclosed herein. Control is passed to operation 440 and process 400 continues.

In operation 440 a determination is made as to whether a user accepts an offer to view an alternate search result(s) indicated in operation 435. If in operation 440 it is determined that a user does not accept an offer, control is passed to operation 445 and process 400 continues. If in operation 440 it is determined that a user does accept an offer, control is passed to operation 450 and process 400 continues.

The determination in operation 440 may be made based on various criteria. For example, a user action(s) such as activating an action button in a GUI such as the GUI 1500 illustrated in FIG. 15A, the GUI 1900 illustrated in FIG. 18, or the GUI 2000 illustrated in FIG. 19 may indicate that a user accepts an offer, and/or selection of a search result(s) provided by a primary search system, a web page may indicate that a user does not accept an offer, and/or the expiration of a time interval, and/or navigation to a different web page, etc. may indicate that a user does not accept an offer.

In operation 445 (FIG. 4), a URL(s), a time stamp(s), and/or other information may be added to a search monitor log. In at least one embodiment, the search monitor 155 (FIG. 1) may maintain such a log in memory and/or storage media accessible from the user system 135. Any or all information of a search monitor log may be transmitted to the alternate search system 130 via the network 115. In at least one embodiment, an indication of user rejection of the offer in operation 440 is recorded in a search monitor log, and/or transmitted to the alternate search system 130. A search monitor log may include any information within the scope of the embodiments disclosed herein. The alternate search system 130 may transmit a message(s) in response to a message(s) transmitted from the user system 135. Such a message(s) may alter a behavior of the search monitor 155. For example, the search monitor 155 action(s) may be modified or selectively customized so as not to provide an offer to view an alternate search result(s) based on any condition(s), such as a keyword (s) and/or category (ies), etc. associated with a search request. Search monitor action(s) may be modified to provide information of an incentive(s) for a user to utilize a service(s) of the alternate search service. Action(s) associated with a search monitor may be modified in any manner. The database 120 is updated. Control is passed to operation 405 (FIG. 4) and process 400 continues.

In operation 450 information of a search result(s) provided by the alternate search service 130 is provided. For example, the application program 150 such as a browser may be directed to a web page provided by the alternate search system 130. A user may be presented with a search result(s) using an interface such as the GUI 1550 illustrated in FIG. 15B and/or the GUI 1600 illustrated in FIG. 15C. Any interface, including a VoiceXML interface, a GUI, a touch-screen interface, an SMS, EMS, MMS, or other message, etc., may be presented to a user. Control is passed to operation 455 and process 400

In operation 455, information including of user action(s) responsive to an alternate search result(s) presented to a user in operation 450 may be obtained. For example, if a user clicks through a URL action control of a search result, or if a user indicates an opinion(s) regarding a search result(s), etc. the actions may be recorded. Action(s) of the search monitor 155 may be modified based on information of a user action(s) obtained in operation 455. Information of a user action(s) may be recorded in a search monitor log. Information of user actions may be transmitted to the alternate search system 130 (FIG. 1). A rating(s) of a search result(s) may be modified based on user actions associated with the search result(s). The database 120 is updated. Control is passed to operation 405 and process 400 continues.

Figure 5:
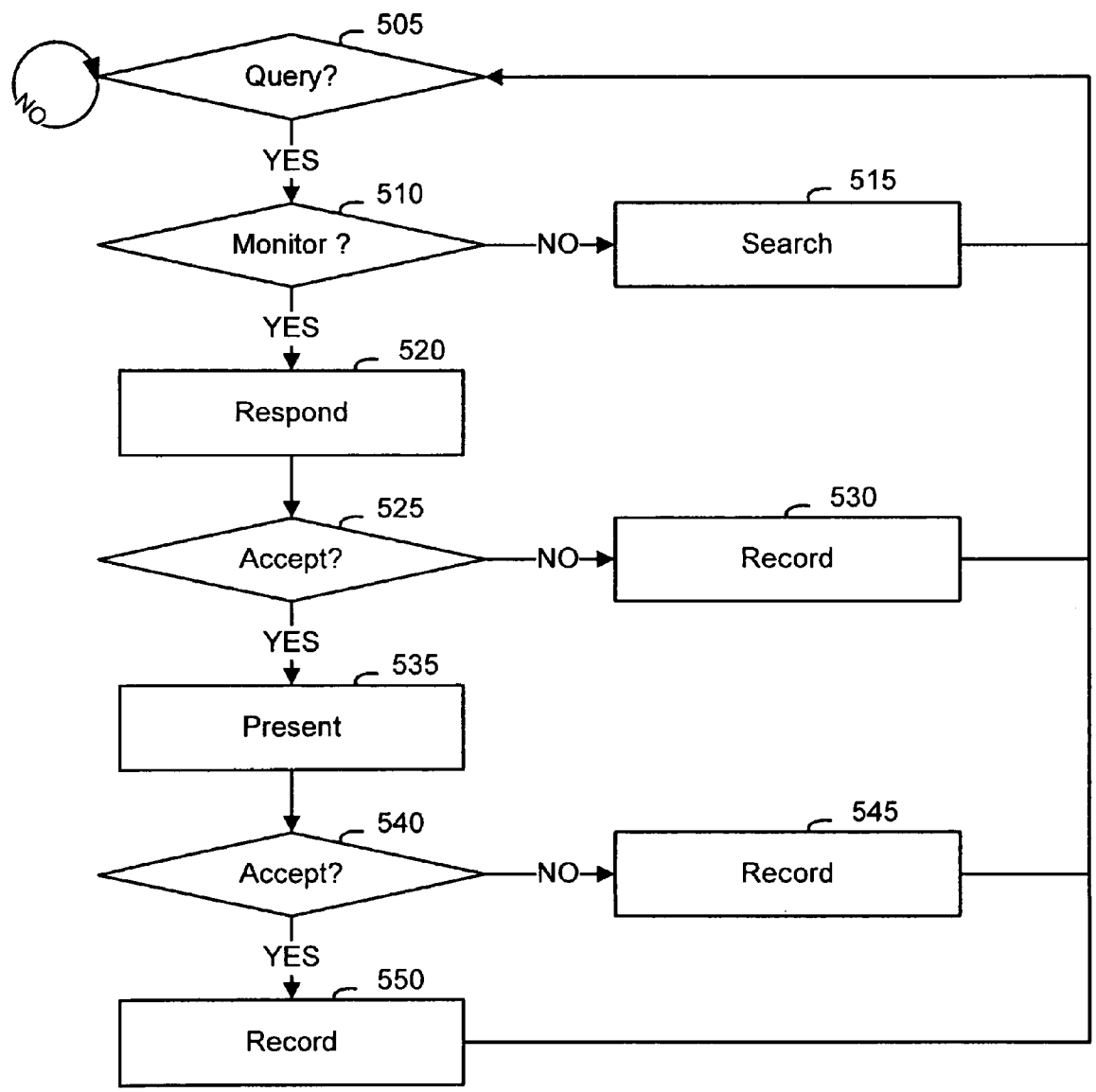
FIG. 5 is a flow diagram of a process for providing a search result(s)

As illustrated in FIG. 5, a process 500 for providing a search result(s) to a user system is provided. The process 500 may be operative on the alternate search system 130 (FIG. 1).

In operation 505, a determination is made as to whether a search query is received. If in operation 505 it is determined that a search query is not received, control remains with operation 505 and process 500 continues. If in operation 505 it is determined that a search query is received, control is passed to operation 510 and process 500 continues.

In operation 510 a determination is made as to whether a query is generated by a search monitor such as the search monitor 155 (FIG. 1). If in operation 510 (FIG. 5) it is determined that a query is not generated by a search monitor, control is passed to operation 515 and process 500 continues. If in operation 510 it is determined that a query is generated by a search monitor, control is passed to operation 520 and process 500 continues.

The determination in operation 510 may be made based on various criteria. In at least one embodiment, determination is made as to whether a message received in operation 505 includes an indicator that a search request is generated by a search monitor. For example, a unique identifier of a search monitor may be included in a message transmitted from the user system 135 (FIG. 1) by the search monitor 155. Any indication that a search request is generated by a search monitor may be utilized within the scope of the embodiments disclosed herein.

In operation 515 an information search is performed by the alternate search system 130. Control is passed to operation 505 and process 500 continues.

In operation 520 a response is transmitted to a search monitor such as the search monitor 155 (FIG. 1) which may be resident on a user system such as the user system 135. In at least one embodiment, a message may be examined to determine a primary search engine to which a search query was submitted, and content(s) of a search query. A search result(s) responsive to a search request may be obtained in various ways. In at least one embodiment, an information search may be performed by the alternate search system 130 (FIG. 1). In at least one embodiment, a search query may be submitted to a primary search system(s) such as the primary search system 160 (FIG. 1). A selection may be made from among search result(s) and the selected result may be returned to a search monitor. The selection may be based on various criteria. In at least one embodiment, a search result(s) produced by a human searcher(s) may be selected. A search result(s) to be returned to a search monitor may be compared to a search result(s) produced by a primary search engine to determine if it is eligible to be returned to a search monitor. For example, if a search result(s) is included in a message received from the primary search system 160, it may not be eligible to be returned to a search monitor. If no search result(s) are selected to be returned to a search monitor, a message(s) indicating such a status may be transmitted to a search monitor. Information of a user query, a primary search engine, etc. may be recorded in the database 120 (FIG. 1). Such information may be used for any purpose by the system. For example, a query may be submitted to a human searcher(s) to determine if a superior search result(s) may be obtained responsive to a query(ies). A process for selecting a search result(s) and/or a searcher(s) responsive to a search query is further described herein with respect to FIG. 13 and FIG. 14. The database 120 is updated. Control is passed to operation 525 and process 500 continues.

In operation 525 a determination is made as to whether a user accepts an option to review an alternate search result(s). If in operation 525 it is determined that a user does not accept an option to view an alternate search result(s) control is passed to operation 530 and process 500 continues. If in operation 525 it is determined that a user accepts an option to review an alternate search result(s) control is passed to operation 535 and process 500 continues.

The determination in operation 525 may be made based on various criteria. In at least one embodiment, a message is received at the alternate search system 130 (FIG. 1) which indicates that a user does or does not accept an option to review an alternate search result(s). The determination in operation 525 may be based at least in part on information indicated in the database 120. Any information may be used to determine user acceptance. For example, a message may be received from a search monitor such as the search monitor 155.

In operation 530 a user action(s) may be recorded. For example, a user may decline to review an alternate search result(s), select a search result(s) provided by a search engine (s) such as the primary search engine 160 (FIG. 1), and/or may allow a time interval to pass, etc. Such information may be recorded and/or transmitted by a search monitor such as the search monitor 155 to the alternate search system 130. Any information of a user action(s) may be obtained and/or recorded in operation 530. In at least one embodiment, user rejection of an option to review a search result(s) may be used to modify a ranking(s) or rating(s) of a search result(s) and/or a searcher(s) associated with a search result(s). A message(s) may be transmitted to the user system 135. For example, information may be transmitted which may alter an action(s) of the search monitor 155. The database 120 is updated. Control is passed to operation 505 and process 500 continues.

In operation 535 information of a search result(s) may be presented to a user(s). A GUI such as the GUI 1550 illustrated in FIG. 15B may be presented to a user. Alternately a search result(s) may be presented to a user using a VoiceXML menu, a touch-screen interface, an SMS, EMS, MMS, or other message, etc., or any other interface(s). Control is passed to operation 540 and process 500 continues.

In operation 540 a determination is made as to whether a user accepts a search result(s) presented in operation 535. If in operation 540 it is determined that a user does not accept a search result(s), control is passed to operation 545 and process 500 continues. If in operation 540 it is determined that a user accepts a search result(s) control is passed to operation 550 and process 500 continues.

The determination in operation 540 may be made based on various criteria. In at least one embodiment, a user 'clicking on' and/or viewing a search result(s) associated with information of a search result(s) presented in operation 535 is used to determine whether a user accepts a search result(s). A user may provide a rating(s) of a search result(s) presented in operation 535 which may indicate acceptance of a search result(s). In at least one embodiment, time spent by a user viewing a search result(s), clicking through a link associated with a search result(s), or clicking through an advertisement associated with a search result(s) may be used determine user acceptance and/or a rating(s) of a search result(s).

In operation 545 user response(s) to a search result(s) presented in operation 535 may be recorded in the database 120 (FIG. 1) and/or a search monitor log. For example, information of user actions may be transmitted to the user system 135 and may be recorded at the user system by for example, the search monitor 155. Alternately, information of a user action (s) may be monitored by the search monitor 155, and transmitted to the alternate search system 130. Information of a user rejection of a search result(s) may affect a ranking and/or rating(s) of a search result(s), a searcher(s) and/or other information indicated in the database 120. In at least one embodiment, information of user acceptance of a search result(s) may be used to determine an action(s) of a search monitor. For example, a user who has consistently accepted a result(s) offered by a search monitor may be presented with an option to make the alternate search system 130 his or her default search engine. Alternately, a user who has rejected a search result(s) may not be presented with an option to review a search result(s) associated with a keyword(s) and/or category (ies) and/or other information associated with a query. A user might be offered an incentive to review a search result(s) indicated by the alternate search system 130. In at least one embodiment, if a search result is rejected by a user, the search query may be transmitted to a guide who may perform a search responsive to the query. The database 120 is updated. Control is passed to operation 505 and process 500 continues.

In operation 550 information of a search result(s) accepted in operation 540 may be presented to a user. A user may be requested to rate a search result(s). For example, a GUI such as the GUI 1600 illustrated in FIG. 15C may be presented to a user in order to obtain a rating(s) of a search result(s). Information of user acceptance of a search result(s) may be used to modify a rating(s) and/or ranking(s) associated with a search result(s) and/or a searcher(s). For example, a searcher who provided a search result which is accepted, selected and/or rated may be compensated. Likewise a search result which is accepted may have a higher ranking and/or rating based on user acceptance of a search result(s). Information of user acceptance may be recorded in the database 120, and/or transmitted to a user device, such as the user system 135, where it may be recorded in a search monitor log. The database 120 is updated. Control is passed to operation 505 and process 500 continues.

User ratings of a search result(s) may be determined in various ways. For example, user click-through, or other user actions may be monitored based on keystrokes and/or any information which may be obtained by the search monitor 155. A user may be requested to provide active ratings of a search result(s). For example, in addition to a search result(s), a user may be presented with one or more rating controls which may be used to indicate user opinion regarding a search result(s) as is further described herein with respect to FIG. 15C.

As previously described, the search monitor may be implemented as an extension. In such an embodiment, information may be exchanged between the search monitor 155 and the alternate search system 130 in order to update information included in the database 120 based upon any information which may be indicated in the user system 135. Likewise, information indicated in a user system such as the user system 135 may be modified and/or updated based on information indicated in the database 120. Operation(s) included in the method 400 and/or the method 500 may be performed by software operating on any device(s) in the system 100.

As illustrated in FIG. 6, a sample of a search monitor log record 600, of which one or more may be associated with or resident in the database 120 (FIG. 1) and/or in the user system 135 is provided. The search monitor log record may include a search monitor identifier (ID) field 605, a URL list field 610, a user actions field 615, a time stamp field 620, and an auxiliary information field 625.

A search monitor log record 600 may be created in various ways. In at least one embodiment, a search monitor log record(s) is created by the search monitor 155 and may be recorded in any suitable memory device(s). In a preferred embodiment, a search monitor log is maintained in the user system 135 and in the database 120 (FIG. 1). Any information indicated in a search monitor log may be transmitted to the alternate search system 130 and/or the user system 135 at any time.

The search monitor ID field 605 serves to identify a search monitor record associated with a search monitor from the search monitor record associated with another search monitor. The search monitor ID field 605 preferably contains a unique identifier of a search monitor, which is preferably used consistently. For example, in at least one embodiment, the search monitor ID field 605 can include a randomly generated numerical code, and/or a text string indicating the ID of a search monitor. A unique identifier may be assigned to a search monitor when it is distributed to a user, may be assigned by the alternate search system 130 when a search monitor communicates with the alternate search system 130, or may be assigned by any other suitable means. Using the example in FIG. 6, 'chachahelper 1000' is the search monitor ID associated with the search monitor record 600. In at least one embodiment, the search monitor ID is based on a random number.

The URL list field 610 may include a URL(s) entered or otherwise indicated by a user. The URL list field may be used to maintain a record of any or all URL's visited by a user system which has a search monitor such as the search monitor 155 (FIG. 1) operative on the user system. In at least one embodiment, URLs relating to search activities may be recorded in the URL list field 610. Alternately, the URL list field 610 may include any URL(s) visited by a user. Continuing with the example in FIG. 6, the URL 'http://www.website1.com' and 'http://www.dogpile.com' have been recorded in the URL list field 610. While only two URL's are illustrated in the example, any number of URL's may be recorded in the URL list field 610. The URL list field 610 may include any or all elements of a URL entered by a user. Any information regarding activity associated with an application such as the application program 150 may be recorded in a search monitor log record. While a URL has been used for the purposes of illustration information regarding any type of message which may be used to submit a search request may be recorded in the URL list field 610. In at least one embodiment, the URL list field 610 and the time stamp field 620 may be linked by for example a pointer.

The user actions field 615 may include information of a user action(s) which is obtained using for example the search monitor 155. Such information may include keystrokes, navigation commands, and/or any other information of a user action(s). For example, user actions related to a web page which may contain a search result(s) provided by the primary search system 160 may be logged and recorded in the search monitor record 600. Any information which may be made accessible to an extension and/or a service such as the search monitor may be recorded. Using the example illustrated in FIG. 6, the user actions 'select book mark 'http://www.dogpile.com'', 'type 'who is brown leaves?' in search box', 'left click on 'search' button', 'right click on 'Operation Brown Leaves', 'select 'open in new tab'' are recorded in the user actions field. Any or all user actions may be recorded in the user actions field 615. In at least one embodiment, the user actions field 615 and the time stamp field 620 may be linked by for example a pointer.

The time stamp field 620 may include information of time which is related to any or all information included in a search monitor log. For example, a date and time associated with a URL being visited may be recorded in the time stamp field 620. In at least one embodiment, the URL list field 610, the user actions field 615, and the time stamp field 620 are linked by for example a pointer. Information of user action(s) such as time spent viewing information of a URL, link(s) followed, advertisements, etc. may be recorded. Continuing with the example illustrated in FIG. 6, the time information '22.15.06.12.08.2007' is associated with the URL 'http://www.website1.com' and the time information '22.17.10.12.08.2007' is associated with the URL 'http://www.dogpile.com'. Likewise, the time information '22.16.45.12.08.2007' is associated with the user action 'select book mark 'http://www.dogpile.com'', the time information '22.16.52.12.08.2007' is associated with the user action 'type 'who is brown leaves?' in search box', the time information '22.17.09.12.08.2007' is associated with the user action 'left click on 'search' button', the time information '22.17.35.12.08.2007' is associated with the user action 'right click on 'Operation Brown leaves', and the time information '22.17.36.12.08.2007' is associated with the user action 'select 'open in new tab''. The timestamp information, URL's, and user actions illustrated are exemplary and no limitation is implied thereby.

The auxiliary information field 625 may include any information indicated in a user system such as the user system 135 (FIG. 1). For example, a list of bookmarks and folder labels associated with a bookmark(s) may be included in the auxiliary information field 625. Using the example illustrated in FIG. 6, the bookmarks 'www.space.com', and 'www.science.com' and the folder name 'science sites' are included in the auxiliary information field 625. Such information may be used to enhance the relevance of a search result(s) and/or other information provided by the alternate search system 130 responsive to a user query(ies). In at least one embodiment, information of a default search engine service may be obtained from an application such as a browser and recorded in the auxiliary information field 625

The search monitor log record 600 may comprise additional fields within the scope of the disclosure herein. Any information accessible by the search monitor 155 and/or indicated in the database 120 may be included in a search monitor log. For example, information of a primary search engine utilized by a user, information of a keyword(s), category(ies) or other information associated with a search monitor, information of user purchase transactions, advertisements viewed, a search history, and/or any other information may be included in a search monitor log. The information contents illustrated in the search monitor log record 600 are exemplary and no limitation is implied thereby. Various ways of representing such information which are well known in the relevant art may be utilized without departing from the spirit and scope of the embodiments disclosed herein.

As illustrated in FIG. 7, a sample of a search monitor user record 700, of which one or more may be associated with or resident in the database 120 (FIG. 1) and/or in the user system 135 is provided. The search monitor user record 700 may include a search monitor identifier (ID) field 705, a query ID field 710, a searcher ID field 715, a search engine field 720, and a rating field 725.

The search monitor ID field 705 serves to identify a search monitor user record associated with a search monitor from the search monitor user record associated with another search monitor. The search monitor ID field 705 preferably contains a unique identifier of a search monitor, which is preferably used consistently. For example, in at least one embodiment, the search monitor ID field 705 can include a randomly generated numerical code, and/or a text string indicating the ID of the search monitor. A unique identifier may be assigned to a search monitor when it is distributed to a user, may be assigned by the alternate search system 130 when a search monitor communicates with the alternate search system 130, or may be assigned any other suitable means. Using the example in FIG. 7, 'chachahelper 1000' is the search monitor ID associated with the search monitor user record 700. In at least one embodiment, the search monitor ID is based on a random number.

The query ID field 710 may include an identifier of a search query(ies) submitted by a search monitor such as the search monitor 155 (FIG. 1). The query ID field 710 (FIG. 7) may include an indicator of one or more queries submitted to the alternate search system 130 (FIG. 1). Information indicated in the query ID field 710 may be used for any purpose. In at least one embodiment, content(s) of the query ID field 710 may be used to provide an indicator that a search result(s) for a query has been produced. In at least one embodiment, information indicated in the query ID field 710 may be used to provide search history functionality to a user of a search monitor, which may be based on any information indicated in the database 120, and/or the user system 135. Continuing with the example in FIG. 7, the query ID 'who is brown leaves?' and the query ID 'what is the best Italian restaurant in downtown Chicago?' have been associated with the search monitor user record 700, which may indicate that 'chachahelper 1000' has submitted the query 'who is brown leaves?' and the query 'what is the best Italian restaurant in downtown Chicago?'.

The searcher ID field 715 may include an identifier(s) of a searcher(s) who may have provided a search result(s) to a user of a search monitor. The searcher ID field 715 may indicate that a search result(s) associated with a searcher indicated in the searcher ID field 715 has been selected and/or rated by a user of a search monitor such as the search monitor 155. The searcher ID field 715 may indicate a searcher(s) for various reasons, such as a searcher being eligible to respond to a query, a searcher being a highest ranking searcher available to respond to a query, etc. In at least one embodiment, a rating may be associated with a searcher and a search monitor Using the example illustrated in FIG. 7 the searchers 'Paula 1126' and 'Sergei1 1000' have been associated with the search monitor record 700. In at least one embodiment, the query ID field 710 and the searcher ID field 715 are linked by for example a pointer.

The search engine field 720 may include an indicator of a search engine(s) which may be utilized by a user of a search monitor such as the search monitor 155. One or more search engines may be indicated in the search engine field 720. Information in the search engine field 720 may be utilized for any purpose. In at least one embodiment, information indicated in a search engine field 720 may be used to rank a search result(s), or other information presented to a user. Information indicated in the search engine field 720 may be utilized to analyze a competitive search engine(s) to the alternate search system 130. A query(ies) may be submitted to a search system based at least in part on information indicated in the search engine field 720. Using the example illustrated in FIG. 7, the search engines 'www.dogpile.com' and 'www.ask.com' are associated with the search monitor user record 700. This may indicate that a user of a search monitor 'chachahelper 1000' has designated 'www.ask.com' and/or 'www.dogpile.com' as a preferred search engine.

The rating field 725 may include information of a rating(s) provided by a user(s) of a search monitor such as the search monitor 155. One or more rating(s) and/or type(s) of rating(s) may be indicated in the rating field 725. In at least one embodiment, a rating may indicate a user rating of a search result(s) provided responsive to a query(ies). For example, a relevance score such as a value between zero and ten may be indicated and/or a rating of a result versus a user target related to a characteristic may be indicated, a user acceptance of a result(s) (e.g., yes/no) may be indicated, etc. Using the example in FIG. 7, the rating '9' and 'A-12' are associated with the search monitor user 'chachahelper 1000'. This may for example indicate that the search engine 'www.dogpile.com' has a ranking of '9' based on ratings provided by 'chachahelper 1000', and/or that the search engine 'www.ask.com' has a rating 'A-12'.

The search monitor user record 700 may comprise additional fields within the scope of the disclosure herein. Any information accessible by the search monitor 155 and/or indicated in the database 120 may be included in a search monitor user record(s). The information contents illustrated in the search monitor user record 700 are exemplary and no limitation is implied thereby. Various ways of representing such information which are well known in the relevant art may be utilized without departing from the spirit and scope of the embodiments disclosed herein.

As illustrated in FIG. 8, a sample of a searcher record 800, of which one or more may be associated with or resident in the database 120 (FIG. 1) and/or in the user system 135 is provided. The searcher record 800 may include a searcher identifier (ID) field 805, a keyword ID field 810, a category ID field 815, a result ID field 820, a query ID field 825, and a searcher rating field 830.

The searcher ID field 805 serves to identify a searcher record associated with a searcher or guide from the searcher record associated with another searcher. The searcher ID field 805 preferably contains a unique identifier of a searcher which is preferably used consistently. For example, in at least one embodiment, the searcher ID field 805 can include a randomly generated numerical code, and/or a text string indicating the ID of the searcher. A unique identifier may be assigned to a searcher when the searcher is registered with the alternate search system 130. Using the example in FIG. 8, 'Paula 1126' is the searcher ID associated with the searcher record 800. In at least one embodiment, the searcher ID is based on a random number. Other identifiers of a searcher may be utilized without departing from the spirit and scope of the embodiments herein.

The keyword ID field 810 may include an identifier of a keyword(s) associated with a searcher. A keyword(s) may be associated with a searcher in various ways. In at least one embodiment, a keyword(s) is associated with a searcher (or guide) during a registration process. A searcher (or guide) may elect to be associated with a keyword. The keyword ID field 810 may include an indicator of one or more keyword(s) indicated in the database 120 (FIG. 1). Information indicated in the keyword ID field 810 may be used for any purpose. In at least one embodiment, content(s) of the keyword ID field 810 may be used select a searcher(s), a search result(s) and/or other information associated with a keyword(s). Continuing with the example in FIG. 8, the keyword 'brown leaves', the keyword 'the best site for the Green Party', and the keyword 'Whales at Sea World' have been associated with the searcher 'Paula 1126' which may indicate that 'Paula 1126' has registered to accept search requests associated with the keyword 'brown leaves', the keyword 'the best site for the Green Party', and the keyword 'Whales at Sea World'.

The category ID field 815 may include an identifier of a category(ies) associated with a searcher. A category(ies) may be associated with a searcher in various ways. In at least one embodiment, a category(ies) is associated with a searcher (or guide) during a registration process. A searcher (or guide) may elect to be associated with a category. The category ID field 815 may include an indicator of one or more category(ies) in the database 120 (FIG. 1). Information indicated in the category ID field 815 may be used for any purpose. In at least one embodiment, content(s) of the category ID field 815 may be used select a searcher(s), a search result(s), and/or other information associated with a category(ies). Continuing with the example in FIG. 8, the category 'Arts>Music' and the category 'Politics>Charity' have been associated with the searcher 'Paula 1126', which may indicate that 'Paula 1126' has registered to accept search requests associated with the category 'Arts>Music' and the category 'Politics>Charity'

The result ID field 820 may include an identifier of a search result(s) or result(s) associated with a searcher. A search result(s) may be associated with a searcher in various ways. In at least one embodiment, a result(s) is associated with a guide if a search result is provided by a guide responsive to a query. The result ID field 820 may include an indicator of one or more search result(s) indicated in the database 120 (FIG. 1). Information indicated in the result ID field 820 may be used for any purpose. In at least one embodiment, content(s) of the result ID field 820 may be used to select a searcher and/or a search result(s) associated with a searcher. Continuing with the example in FIG. 8, the result 'www.brownleaves.jp', the result 'www.getgreennow.org' and the result 'www.freethewhales.net' have been associated with the searcher 'Paula 1126' which may indicate that 'Paula 1126' has provided the result 'www.brownleaves.jp', the result 'www.getgreennow.org' and the result 'www.freethewhales.net' responsive to a search request.

The query ID field 825 includes an identifier of a query(ies) associated with a searcher. A query(ies) may be associated with a searcher in various ways. In at least one embodiment, a query(ies) is associated with a searcher (or guide) if a search result is provided by the searcher (or guide) responsive to a query. The query ID field 825 may include an indicator of one or more query(ies) indicated in the database 120 (FIG. 1). Information indicated in the query ID field 825 may be used for any purpose. In at least one embodiment, content(s) of the query ID field 825 may be used select a searcher and/or a search result(s) associated with a searcher. Continuing with the example in FIG. 8, the query 'who is brown leaves?', the query 'what is the best site for the Green Party?' and the query 'how can I help whales at SeaWorld?' have been associated with the searcher 'Paula 1126', which may indicate that the searcher 'Paula 1126' has provided a search result(s) responsive to the query 'who is brown leaves?', the query 'what is the best site for the Green Party?' and the query 'how can I help whales at SeaWorld?'

The searcher rating field 830 includes information of a rating(s) associated with a searcher or guide. One or more rating(s) and/or type(s) of rating(s) may be indicated in the rating field 830. In at least one embodiment, a rating may indicate a rating of a searcher related to a keyword(s) and/or a category(ies). A rating may be any type of information which indicates a rating of an item such as a search result, an advertisement, a searcher, etc. Rating information may be represented in any way. Continuing with the example in FIG. 8, the ratings 1;3;2 have been associated with the searcher 'Paula 1126', which may indicate for example that the search result 'www.brownleaves.jp' is the top ranked result associated with the query 'who is brown leaves?', that 'www.getgreennow.org' is the third ranked search result associated with the query 'what is the best sit for the Green Party, and that 'www.freethewales.net' is the second ranked search result associated with the query 'how can I help whales at SeaWorld?'

A searcher record such as the searcher record 800 may comprise additional fields within the scope of the disclosure herein. Any information accessible by the search monitor 155 and/or indicated in the database 120 may be included in a searcher record(s). The information contents illustrated in the searcher record 800 are exemplary and no limitation is implied thereby. Various ways of representing such information which are well known in the relevant art may be utilized without departing from the spirit and scope of the embodiments disclosed herein.

As illustrated in FIG. 9, a sample of a query record 900, of which one or more may be associated with or resident in the database 120 (FIG. 1) and/or in the user system 135 is provided. The query record 900 may include a query identifier (ID) field 905, a keyword ID field 910, a category ID field 915, a result ID field 920, a user ID field 925, a searcher ID field 930 and a search engine ID field 935.

The query ID field 905 serves to identify a query record associated with a search query or request from the query record associated with another search query. The query ID field 905 preferably contains a unique identifier of a search query which is preferably used consistently. For example, in at least one embodiment, the query ID field 905 can include a randomly generated numerical code, and/or a text string indicating the ID of the query. A unique identifier may be assigned to a search query when the query is received by the alternate search system 130. Using the example in FIG. 9, 'who is brown leaves?' is the query ID associated with the query record 900. In at least one embodiment, the query ID is based on a random number. Other identifiers may be utilized without departing from the spirit and scope of the embodiments herein.

The keyword ID field 910 may include an identifier of a keyword(s) associated with a query. A keyword(s) may be associated with a search query in various ways. In at least one embodiment, a keyword(s) is associated with a query when a query is received by the alternate search system 130. A keyword(s) may be associated with a query automatically and/or using the assistance of a guide(s) or human assistant(s). The keyword ID field 910 may include an indicator of one or more keyword(s) indicated in the database 120 (FIG. 1). Information indicated in the keyword ID field 910 may be used for any purpose. In at least one embodiment, content(s) of the keyword ID field 910 may be used to select a searcher, a search result(s), an advertisement and/or other information responsive to a query or search request. Continuing with the example in FIG. 9, the keyword 'brown', the keyword 'leaves', and the keyword 'brown leaves' have been associated with the query 'who is brown leaves?'

The category ID field 915 may include an identifier of a category(ies) associated with a query. A category(ies) may be associated with a query or search request automatically and/or using the assistance of a guide or searcher. The category ID field 915 may include an indicator of one or more category(ies) indicated in the database 120 (FIG. 1). Information indicated in the category ID field 915 may be used for any purpose. In at least one embodiment, content of the category ID field 915 may be used to select a searcher, a search result(s), an advertisement(s) and/or other information responsive to a query. Continuing with the example in FIG. 9, the category 'Home>Gardening' and the category 'Arts>Music' have been associated with the query 'who is brown leaves?'

The result ID field 920 may include an identifier of a search result(s) associated with a query. A search result(s) may be associated with a query in various ways. In at least one embodiment, a search result(s) is associated with a query if a search result(s) is provided by a searcher (or guide) responsive to a query. In at least one embodiment, a search result(s) may be associated with a query if the search result is provided by a search service such as the primary search system 160. The result ID field 920 may include an identifier of one or more search result(s) indicated in the database 120 (FIG. 1). Information indicated in the result ID field 920 may be used for any purpose. In at least one embodiment, content of the result ID field 920 may be used to select a search result(s), a searcher, and/or other information responsive to a query.

For example, continuing with the example in FIG. 9, the search result 'www.brownleaves.jp', the search result 'www.science.org\leafscience', the search result 'www.amazon.com\brownleaves' and the search result 'www.gardening.com' have been associated with the query 'who is brown leaves?'. While a URL has been used as an identifier of a search result(s) in FIG. 9 for the purposes of illustration, no limitation is implied thereby. A search result(s) may include any type(s) of information which might be provided to a user responsive to a search request. For example, a search result(s) might include text, images, audio and/or any type(s) of media or content which may be provided to a user(s). In at least one embodiment, a rating and/or ranking of a search result(s) associated with a query may be indicated in a query record. For example, if a search result is provided by a guide, and is also provided by an automated search system such as the primary search system 160, the search result may have a low rating, or if a guide(s) associated with a category associated with a query have voted that a search result(s) is superior to other search results associated with a query, the search result may have a high rating associated with the category and the query.

The user ID field 925 may include an identifier of a user(s) associated with a query. A user(s) may be associated with a query in various ways. In at least one embodiment, a user(s) are associated with a query if a user submits the query to the alternate search system 130. The user ID field 925 may include an indicator of one or more user(s) indicated in the database 120. Information indicated in the user ID field 925 may be used for any purpose. In at least one embodiment, content of the user ID field 925 may be used to select a searcher and/or a search result(s) associated with a query. For example, a searcher who has produced a search result(s) which received a high rating from a user(s) may be selected to respond to a future query associated with the user. Such selection may for example be based on a keyword(s) and/or category(ies) associated with a query and a guide(s). Continuing with the example in FIG. 9, the user ID 'chachahelper 1000' has been associated with the query 'who is brown leaves?' which may indicate that a user system which includes the search monitor 'chachahelper 1000' has submitted the query 'who is brown leaves?' to the alternate search system 130. In at least one embodiment, if a new search result(s) is provided associated with a query, any or all users identified in the user ID field 920 may be notified of the new search result(s).

The searcher ID field 930 may include an identifier of a searcher(s) associated with a query. A searcher(s) may be associated with a query in various ways. In at least one embodiment, a searcher(s) is associated with a query if a search result is provided by a searcher responsive to the query. The searcher ID field 930 may include an indicator of one or more searcher(s) indicated in the database 120 (FIG. 1). Information indicated in the searcher ID field 930 may be used for any purpose. In at least one embodiment, content of the searcher ID field 930 may be used select a searcher(s), a search result(s) associated with a searcher(s), and/or other information responsive to a query. For example, if a searcher has provided a highly rated search result associated with a previous query associated with a user, the searcher may have a higher rating associated with a new query submitted by the user. Continuing with the example in FIG. 9, the searcher ID 'Paula 1126' and the searcher ID 'TomC 1023' have been associated with the query 'who is brown leaves?' which may indicate that the searcher 'Paula 1126' and 'TomC 1023' have provided a number of search results responsive to the query 'who is brown leaves?'.

The search engine ID field 935 may include an identifier of a search engine(s) associated with a query. A search engine(s) may be associated with a query in various ways. In at least one embodiment, a search engine(s) is associated with a query if a search result is provided by a search engine responsive to a search request. The search engine ID field 935 may include an indicator of one or more search engine(s) indicated in the database 120 (FIG. 1). Information indicated in the search engine ID field 935 may be used for any purpose. In at least one embodiment, content of the search engine ID field 935 may be used select a searcher, a search result(s), an advertisement(s) and/or other information responsive to a query. For example, if a search engine(s) is associated with a query, a search result(s) provided by a guide that is also provided by the search engine(s) may have a low rating associated with the query. Continuing with the example in FIG. 9, the search engine ID 'www.dogpile.com' has been associated with the query 'who is brown leaves?'

In at least one embodiment, the results ID field 920 and the searcher ID field 930 and the search engine ID field 935 are linked by for example a pointer. Using the example illustrated in FIG. 9, the searcher 'Paula 1126' may be associated with the search result 'www.brownleaves.jp', the searcher 'TomC 1023' may be associated with the search result 'www.science.org\leafscience', and the search engine 'www.dogpile.com' may be associated with the search results 'www.amazon.com\brownleaves' and 'www.gardening.com'. In at least one embodiment, if a search result(s) is associated with a search engine, the search result(s) may be excluded from consideration as an alternate search result(s) which may be presented to a user using the search monitor 155 (FIG. 1).

A query record such as the query record 900 may comprise additional fields within the scope of the disclosure herein. Any information accessible by the search monitor 155 and/or indicated in the database 120 may be included in a query record(s). The information contents illustrated in the query record 900 are exemplary and no limitation is implied thereby. Various ways of representing such information which are well known in the relevant art may be utilized without departing from the spirit and scope of the embodiments disclosed herein.

As illustrated in FIG. 10, a sample of a keyword record 1000, of which one or more may be associated with or resident in the database 120 (FIG. 1) is provided. The keyword record 1000 may include a keyword identifier (ID) field 1005, a category ID field 1010, a searcher ID field 1015, a category rating field 1020, and a searcher rating field 1025.

A keyword record may be created and/or modified in various ways. For example, a human searcher (or guide) may associate a keyword of a query submitted by a user with one or more categories, which may affect the rating and/or ranking of a category associated with the keyword(s). Likewise, a searcher may elect to be associated with a keyword(s) and/or category(ies), which may cause a searcher ID to be added to a keyword record. A keyword record may be created and/or modified in any way within the scope of this disclosure. For example, a keyword record(s) may be created and/or modified using a database dump from an external database. For example, a database such as artist information and music genre might be imported and various type(s) of item(s) such as a guide(s), an advertisement(s), etc. might be associated with the artist names as keyword(s) and the musical genres as category(ies). Likewise information obtained by processing of electronic media might be used to create a keyword and/or category record(s). For example, a guide might identify documents, web pages, and/or other media which might be indexed using an indexing functionality such as Lucene which might identify a keyword(s) and/or a category(ies) which might be associated with any number of searchers or guides. A keyword record(s) might be created based on actions of a person(s). For example, a guide(s) and/or a user(s) may participate in an activity such as a game, purchasing of item(s), a test(s), etc. which might provide information of and/or rating(s) of a keyword(s), category(ies) and/or other information.

The keyword ID field 1005 preferably includes a unique identifier of a keyword, which is preferably used consistently. In at least one embodiment, the keyword ID field 1005 can include a randomly generated numerical code, and/or a text string indicating the content of a keyword. Other identifiers may be utilized without departing from the spirit and scope of the embodiments herein. A unique identifier may be assigned to a keyword when it is entered into the database 120 (FIG. 1). Using the example in FIG. 10, 'brown leaves' is the keyword ID associated with the keyword record 1000. In at least one embodiment, the keyword ID is based on a combination of a keyword and a categorization associated with a keyword.

The category ID field 1010 may include information of a category(ies) or taxonomy branch associated with a keyword. A person may select a category(ies) which is associated with a keyword. A category may be associated with a keyword in any way. A category may be associated with a keyword based on a selection by a guide(s) responsive to a search request(s) which include the keyword. For example, a searcher (or guide) may associate a category(ies) with a query or search request which may cause the category(ies) to be associated with a keyword(s) of the search request. Using the example illustrated in FIG. 10, the category 'Home>Gardening' and the category 'Arts>Music' are associated with the keyword 'brown leaves'. In at least one embodiment, the category ID field 1010 is linked to the category rating field 1020 by for example a pointer.

The searcher ID field 1015 may include information of a searcher or guide associated with a keyword and/or a category. Using the example in FIG. 10, the guides 'TomC 1023', 'Sergei1 1000' and 'Paula 1126' are associated with the keyword 'brown leaves'. The searcher ID field 1015 may contain information associated with one or more guides which may be used to obtain information associated with the guide(s) from a record(s) such as the searcher record 800 (FIG. 8). In at least one embodiment, the searcher ID field 1015 is linked to the searcher rating field 1025 by for example a pointer.

The category rating field 1020 may include information of a rating(s) and/or ranking(s) of a category associated with a keyword. The content of the category rating field 1020 may be used to rank a category(ies) associated with a keyword. A category rating and/or ranking may be generated and/or modified in any manner. In at least one embodiment, a rating of a category associated with a keyword may be based on frequency of use of a categorization by a guide(s), and/or voting by a guide(s) and/or other rating criteria. Using the example illustrated in FIG. 10, a ranking of '1' is associated with the category 'Home>Gardening' and the keyword 'brown leaves' and a ranking of '2' is associated with the category 'Arts>Music' and the keyword 'brown leaves'. This may indicate that the category 'Home>Gardening' and/or a resource(s) associated with 'Home>Gardening' may be more likely to produce a relevant search result(s) responsive to a query associated with the keyword 'brown leaves' than the category 'Arts>Music' and/or a resource(s) associated with 'Arts>Music' when associated with the keyword 'brown leaves'.

The searcher rating field 1025 may include information of a rating(s) and/or ranking(s) associated with a searcher associated with a keyword. The content of the searcher rating field 1025 may be used to rank a searcher(s) associated with a keyword. A searcher rating(s) and/or ranking(s) may be generated and/or modified in any manner. In at least one embodiment, a rating of a searcher associated with a keyword may be based on rating of a search result(s) produced by a guide for a query(ies) associated with a keyword and/or a category(ies). A rating of a search result(s) associated with a keyword and/or a category may be generated and/or modified in any manner. In at least one embodiment, a rating and/or ranking of a search result(s) may be based on a user rating(s) and/or voting by a guide(s) and/or other rating criteria. Various ways of rating and/or ranking a searcher (or guide) may be utilized within the scope of this disclosure. Continuing with the example illustrated in FIG. 10, the guide 'TomC 1023' has a rating '1', the guide 'Sergei1 1000' has a rating '3', and the guide 'Paula 1126' has a rating '2' associated with the keyword 'brown leaves'. This may indicate that the guide 'TomC 1023' is the top ranked searcher, the guide 'Paula 1126' is the second ranked searcher, and the guide 'Sergei1 1000' is the third ranked searcher associated with the keyword 'brown leaves'. If a search request or query is associated with the keyword 'brown leaves', the searcher 'TomC 1023' may be more likely to be selected to handle the query.

A keyword record such as the keyword record 1000 may comprise additional fields within the scope of the disclosure herein. Any information accessible by the search monitor 155 and/or indicated in the database 120 may be included in a keyword record(s). The information contents illustrated in the keyword record 1000 are exemplary and no limitation is implied thereby. Various ways of representing such information which are well known in the relevant art may be utilized without departing from the spirit and scope of the embodiments disclosed herein.

As illustrated in FIG. 11, a sample of a category record 1100, of which one or more may be associated with or resident in the database 120 (FIG. 1) is provided. The category record 1100 may include a category identifier (ID) field 1105, a searcher ID field 1110, and a searcher rating field 1115.

A category record may be created and/or modified by various means. For example, a human guide may associate a query submitted by a user with one or more categories, which may affect the content of a category record. A searcher may elect to be associated with a category(ies), which might modify the content of a category record. A category record may be created and/or modified by processing as described further herein above. A category record may be created and/or modified in any way within the scope of this disclosure.

The category ID field 1105 preferably includes a unique identifier of a category, which is preferably used consistently. For example, in at least one embodiment, the category ID field 1105 can include a randomly generated numerical code, and/or a text string indicating the content of the category or a taxonomy branch. A unique identifier may be assigned to a category when it is entered into the database 120 (FIG. 1). Other identifiers may be utilized without departing from the spirit and scope of the embodiments herein. Using the example in FIG. 11, 'Arts>Music' is the category ID associated with the category record 1100.

The searcher ID field 1110 may include information of a searcher(s) associated with a category. Content of the searcher ID field 1110 may be created and/or modified in various ways. For example, the content of the searcher ID field 1110 may be modified by a searcher selecting a keyword and/or a category during and/or after registering as a guide with the alternate search system 130 (FIG. 1). Using the example illustrated in FIG. 11, the searchers 'TomC 1023', 'Sergei1 1000' and 'Paula 1126' are associated with the category 'Arts>Music'. The association of a searcher with a category may be made using any method within the scope of the disclosure herein. In at least one embodiment, the searcher ID field 1110 and the searcher rating field 1115 are linked by for example a pointer.

The searcher rating field 1115 may include information of a rating(s) and/or ranking(s) associated with a category and a guide(s). The searcher rating field 1115 may be used to rank a searcher(s) associated with a category. A searcher rating(s) may be generated and/or modified in any manner. In at least one embodiment, a rating of a searcher(s) associated with a category may be based on a rating(s) and/or ranking(s) of a search result(s) produced by a guide for a query(ies) associated with the category. A rating of a search result(s) associated with a category(ies) may be generated and/or modified in various ways. In at least one embodiment, a rating(s) of a search result(s) may be based on a user rating(s) and/or voting by a guide(s) and/or other rating criteria. For example, a rating of a searcher (or guide) associated with a category may be based on the average rating of all search results provided by the guide for queries associated with the category. In such a case, a user rating(s) and/or a rating(s) provided by other guide(s) may be used to determine a rating(s) of a guide(s) associated with a category. Any method of rating and/or ranking a guide(s) may be utilized within the scope of this disclosure.

Continuing with the example illustrated in FIG. 11, the guide 'TomC 1023' has a rating '3', the guide 'Sergei1 1000' has a rating '2', and the guide 'Paula 1126' has a rating '1' associated with the category 'Arts>Music'. This may indicate that the guide 'Paula 1126' is the top ranked searcher, the guide 'Sergei1 1000' is the second ranked searcher, and the guide 'TomC 1023' is the third ranked searcher associated with the category 'Arts>Music'. If a search request or query is associated with the category 'Arts>Music', the searcher 'Paula 1126' may be more likely to be selected to respond to the query. As illustrated herein above, the ranking and/or rating of a searcher(s) and/or a search result(s) may be different depending on information associated with the ranking(s) and/or rating(s) and a searcher(s) and/or a search result(s). Using the example above, the searcher(s) 'TomC 1023', 'Sergei1 1000', and 'Paula 1126' have a different ranking when associated with a keyword (e.g., the keyword 'brown leaves'), and a category (e.g. the category 'Arts>Music'). Rating or ranking of a guide(s) and/or a search result(s) and/or any other item such as an advertisement(s), a search resource, etc. when associated with a query may be affected by any or all information associated with an item(s). Any information indicated in the database 120 (FIG. 1) may be used to determine a ranking(s) and/or rating(s).

A category record such as the category record 1100 may comprise additional field(s) within the scope of the disclosure herein. Any information accessible by the search monitor 155 and/or indicated in the database 120 (FIG. 1) may be included in a category record(s). The information contents illustrated in the category record 1100 are exemplary and no limitation is implied thereby. Various ways of representing such information which are well known in the relevant art may be utilized without departing from the spirit and scope of the embodiments disclosed herein.

Figure 12A:
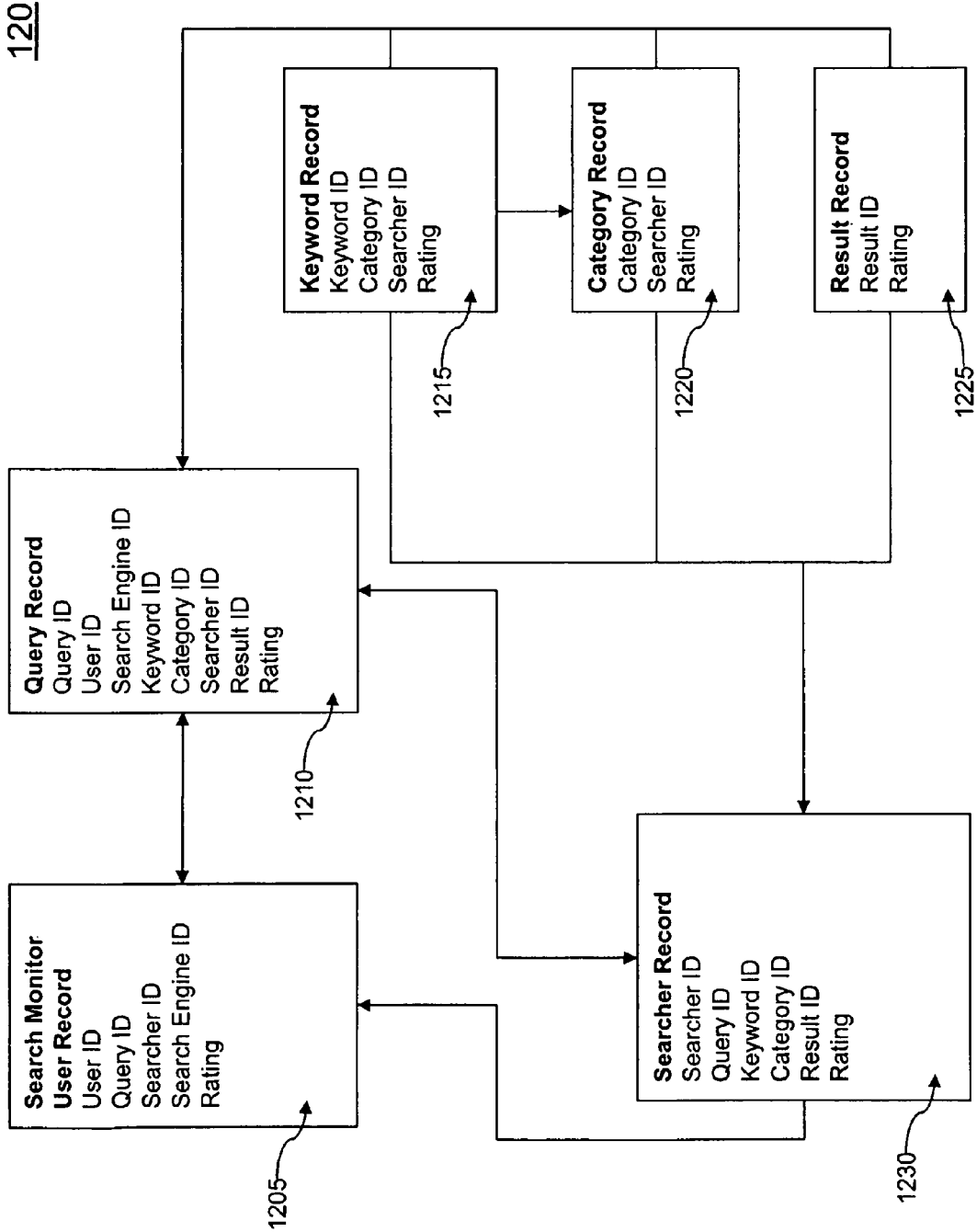
FIG. 12A is a diagram illustrating a database relationship.

A database relationship of information comprised in the database 120 (FIG. 1) is illustrated in FIG. 12A. The relationship is exemplary, and alternate embodiments of the relationships and data structures may be used within the scope of the disclosure herein.

The database 120 (FIG. 1) may comprise one or more of a search monitor user record 1205, a query record 1210, a keyword record 1215, a category record 1220, a result record 1225 and/or a searcher record 1230.

The search monitor user record 1205 may include information of a search monitor user. The information included in the search monitor user record 1205 may indicate a query (ies), a searcher(s), a search engine(s), a rating(s), a ranking (s) and/or other information associated with a user or search monitor user.

The query record 1210 may include information of a query. The information included in a query record 1210 may indicate a user(s), a keyword(s), a category(ies), a searcher(s), a search engine(s), a result(s), a rating(s), a ranking(s), and/or other information associated with a query.

The keyword record 1215 may include information of a keyword, a category(ies), a searcher(s), a rating(s), a ranking (s) and/or other information associated with a keyword.

The category record 1220 may include information of a category or taxonomy branch, a searcher(s), a rating(s) and/or other information associated with a category.

The result record 1225 may include information of a search result and a rating(s) associated with a search result. For example, a URL, a guide comment, a snippet, a tag, access information, and/or any other information of a search result may be included in the result record 1225. Likewise any rating information such as user rating(s), guide ratings(s), and/or any other ranking and/or rating information associated with a search result(s) may be indicated in the result record 1225.

The searcher record 1230 may include information of a searcher, a query(ies), a keyword(s), a category(ies), a profile (s), a result(s), a device(s), a service(s), a rating(s), a ranking (s) and/or other information associated with a searcher.

The association between the records indicated in FIG. 12A may be used to obtain information based on a pointer(s) in the records. For example, a keyword, category, and/or result ID associated with a query record may include a searcher ID which may be used to obtain information of a searcher using a searcher record associated with the searcher ID. A user ID indicated in a query record may be used to obtain information of a user using a search monitor user record associated with the user ID. Various types of information might be selected using database processing which is well known in the relevant art.

The relationships illustrated in FIG. 12A may be used in conjunction with and/or in addition to any other information included in the database 120 (FIG. 1) to rank and select a searcher(s) and/or a search result(s) and/or other information associated with one or more of a query, a keyword, a category, etc., as will be further described herein below. Any of the records described herein may contain additional fields, and one or all of the fields may be blank.

Figure 12B:
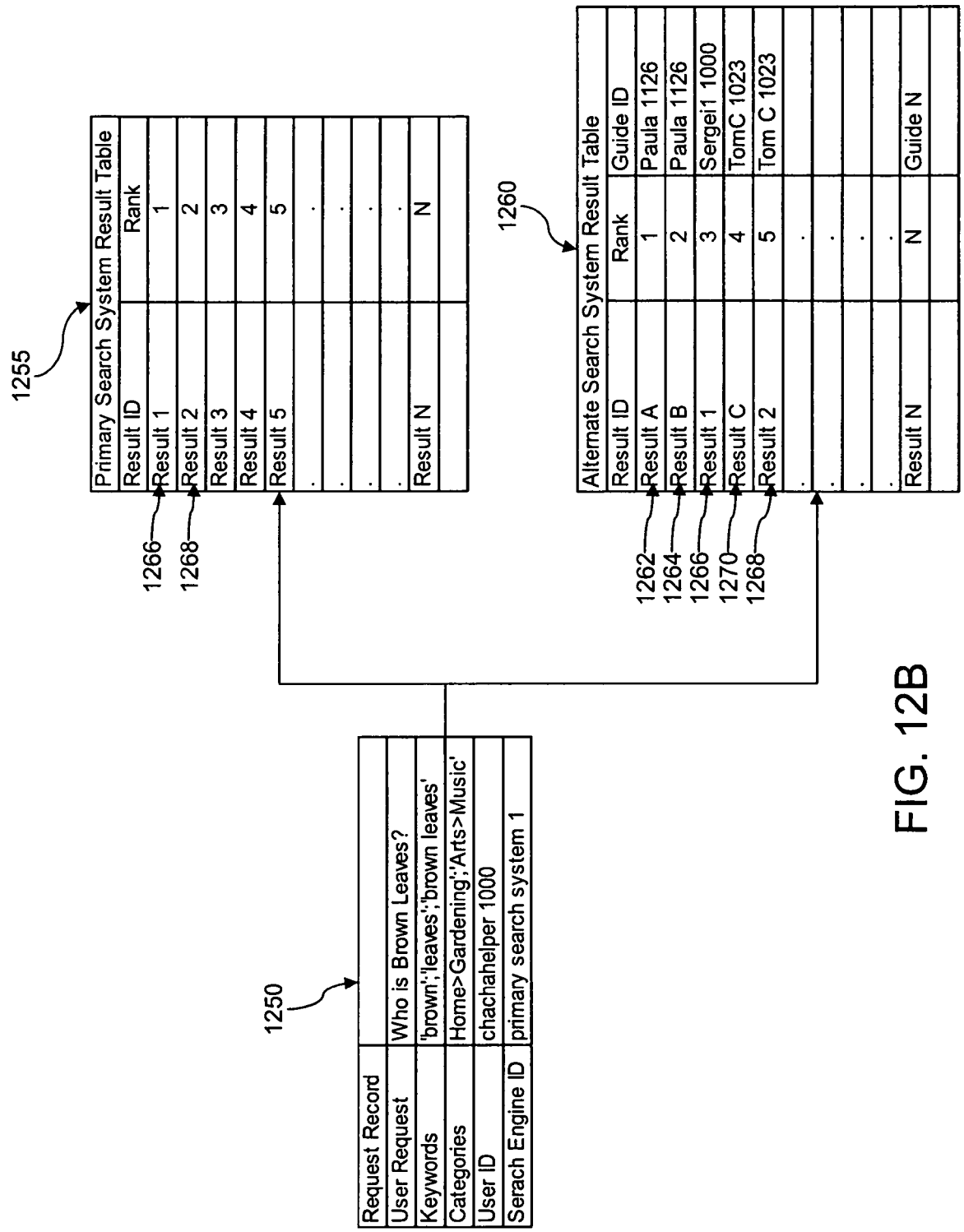
FIG. 12B is a diagram illustrating a selection process.

An exemplary data structure related to determining whether an alternate search result(s) is available is illustrated in FIG. 12B. A search query record 1250 is created which includes information of a search query, keywords, categories, and a user associated with the query. The query may be submitted to the primary search system 160 (FIG. 1) which may provide information such as that indicated in the primary search system results table 1255. The alternate search system 130 may rank search results based on for example the keywords and categories and/or other information associated with a query to produce the information indicated in the alternate search system results table 1260. In at least one embodiment, the entire query string is a keyword.

In order to determine whether an alternate search result is available, the alternate search system 130 (FIG. 1) and/or the search monitor 155 may compare a search result(s) from the alternate search system 130 and a search result(s) from the primary search system 160, and may for example eliminate any search result(s) ranked in the top 20 search results by the primary search system 160. A rating(s) of the search result(s) may be adjusted based on the content of the primary search system results table 1255. Using the example illustrated in FIG. 12B, the 'Result 1' result 1266 and the 'Result 2' result 1268 might have a low ranking for a user of the search monitor 'chachahelper 1000' which is associated with the search engine 'primary search system 1'. Using the example in FIG. 12B, the user of the search monitor 'chachahelper 1000' might be notified of the 'Result A' result 1262, the 'Result B' result 1264 and the 'Result C' result 1270 responsive to the query 'who is brown leaves?'

If a user submits a query for which no alternate search result(s) is available, a searcher with a high ranking relating to the category(ies), keyword(s), and/or the primary search engine(s) associated with the query may be selected to provide a search result(s) responsive to the query. For example, as the guide 'Paula 1126' produced a highly rated search result such as the 'Result A' result 1262 and the 'Result B' result 1264 responsive to a query associated with the search system 'primary search system 1', the guide 'TomC 1023' produced a highly rated search result such as the 'Result C' result 1270 and a duplicate of a result from the primary search system such as the 'Result 2' result 1268, and the guide 'Sergei1 1000' produced the 'Result1' result 1266 which was duplicated by the primary search system, the searcher 'Paula 1126' may be more likely to be selected to provide a search result to a user query associated with the search service 'primary search system 1', than the searcher 'TomC 1023' who may be more likely to be selected than the searcher 'Sergei1 1000'.

The ranking of a search result(s) illustrated in FIG. 12B may be based on any information indicated in the database 120 (FIG. 1), including any selected combination of information pertaining to a result, a query, a user, a searcher, etc.

Figure 13:
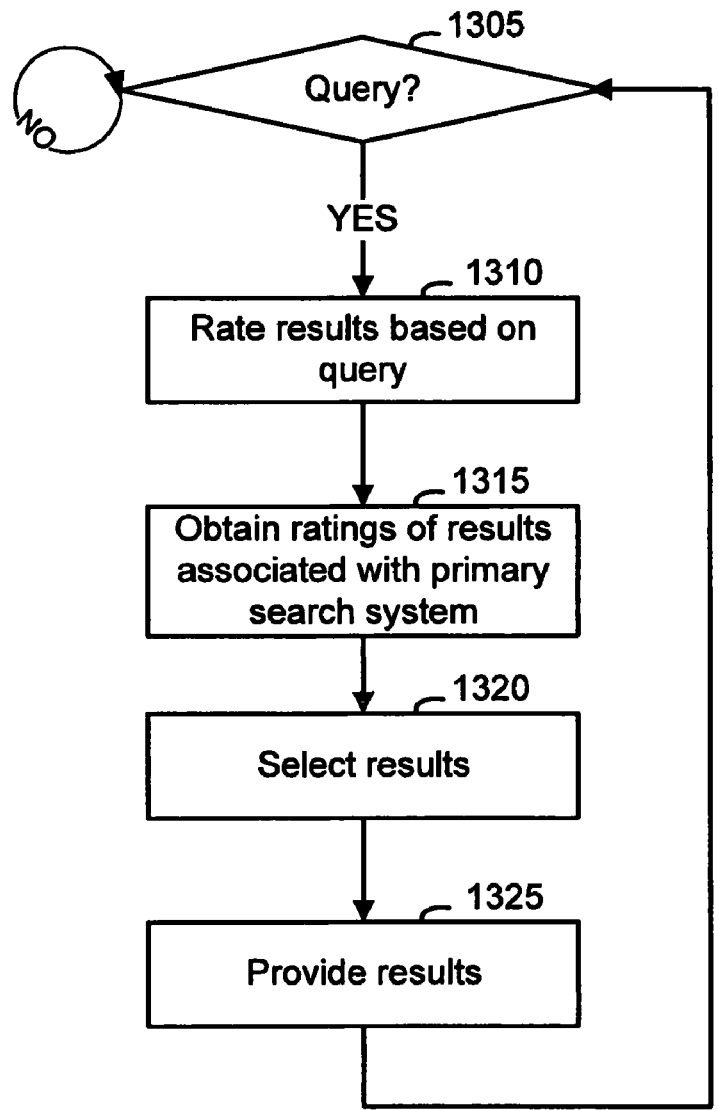
FIG. 13 is a flow diagram of a process for selecting a search result(s).

As illustrated in FIG. 13, a process 1300 for performing an information search is provided. The process 1300 may be operative on the alternate search system 130 (FIG. 1) and/or the user system 135.

In operation 1305 a determination is made as to whether a search request associated with a search monitor is received. If in operation 1305 it is determined that a search request associated with a search monitor is not received control remains at operation 1305 and process 1300 continues. If in operation 1305 it is determined that a search request associated with a search monitor is received control is passed to operation 1310 and process 1300 continues.

In operation 1310 search results associated with a query are rated. The rating may be based on a keyword(s), a category (ies), and/or other information associated with the query. For example, a search result may be rated based on information regarding voting by a searcher or guide(s) associated with a keyword(s) and/or category(ies) associated with a query, based on a ranking of a guide who produced a search result and/or any other rating information within the scope of this disclosure. Control is passed to operation 1315 and process 1300 continues.

In operation 1315 search results associated with a query are rated based on information of a search monitor(s) associated with the query. For example, a search result may be rated based on a ranking from a search engine(s) indicated in a search monitor user record, such ranking may be based on order of presentation from a search system, and/or any other information associated with a search result(s). Any information indicated in the database 120 (FIG. 1) may be used to determine a rating of a search result(s) based on a search monitor associated with a query. For example, a rating of a search result(s) may be based on a ranking(s) of a search result(s) based on a messages received by the search monitor 155. Control is passed to operation 1320 and process 1300 continues.

In operation 1320 a search result(s) associated with a query are sorted. The sort operation in operation 1320 may be based on rating and/or ranking information determined in operation 1310 and/or operation 1315 and/or other information included in the database 120 (FIG. 1). For example, if a search result is ranked higher than fifth according to the rating information in operation 1310 and is not rated above tenth in a ranking from operation 1315, it may be ranked according to its rating in operation 1310. In at least one embodiment, the rating from operation 1310 is based on information of voting by human guides and a search result must be judged to be superior to the 3 top-ranked results from operation 1315. Any process for ranking a search result(s) based on ranking information from operation 1310 and 1315 may be used within the scope of this disclosure. Control is passed to operation 1325 and process 1300 continues.

In operation 1325 a search result(s) is presented to a user responsive to a search request. The order of presentation of a search result(s) may be based at least in part on the order determined by the sorting performed in operation 1320 and/or other information included in the database 120 (FIG. 1), such as a contractual relationship with a number of customers, a random number, etc. In at least one embodiment, the order of presentation is directly related to the order determined by the sort in operation 1320. Control is passed to operation 1305 and process 1300 continues.

The presentation of a search result(s) in operation 1325 may be done in various ways. In at least one embodiment, the search monitor 155 (FIG. 1) may present a notification to a user via the user system 135 if one or more search result(s) associated with a human searcher which are not returned on the first page of results from the primary search engine 160 are identified in operation 1320.

If no search result(s) is identified to be provided to a user(s) in operation 1325, a guide(s) may be selected to respond to a query associated with a search monitor such as the search monitor 155 (FIG. 1). If a selected guide(s) is available to provide a live interactive search session, such information may be presented to a user of the search monitor 155. A selected guide(s) may be notified of a query and may perform a search responsive to the query to provide a search result(s) which may be presented to a user(s). A searcher may be selected based on various factors including but not limited to availability, expertise, knowledge in a particular field, rating, ranking, affiliation, demographic, geographic, personality, interests, etc.

Figure 14:
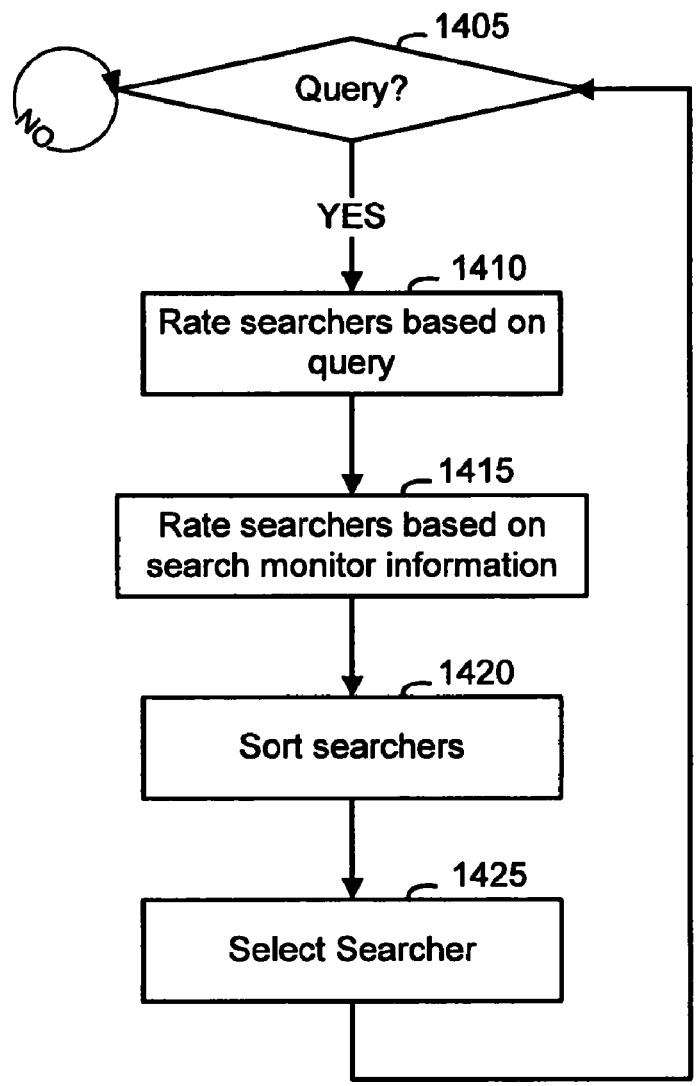
FIG. 14 is a flow diagram of a process for selecting a searcher(s).

As illustrated in FIG. 14, a process 1400 for selecting a searcher or guide to respond to a query or search request is provided.

In operation 1405 a determination is made as to whether a search query or request associated with a search monitor is received. If it is determined in operation 1405 that a search query associated with a search monitor is not received control remains at operation 1405 and process 1400 continues. If it is determined in operation 1405 that a query associated with a search monitor is received control is passed to operation 1410 and process 1400 continues.

In operation 1410 a guide(s) associated with a query are rated based on a keyword(s), a category(ies), and/or other information associated with the query. For example, a searcher may be rated based on voting by a guide(s) associated with a keyword(s) and/or category(ies) associated with a query, based on a ranking of a guide associated with a category(ies) or keyword(s), based on a competence of a searcher, or any rating information which may be available. Control is passed to operation 1415 and process 1400 continues.

In operation 1415 a searcher(s) or guide(s) associated with a query are rated, including based on information of a search monitor(s) associated with the query. For example, a searcher may be rated based on information indicated in a search monitor record(s) associated a searcher and information indicated in a search monitor record(s) associated with a query. A searcher may be rated based on voting by a guide(s) selected using information indicated in a search monitor user record associated with a query, or any other ranking process. For example, if a searcher has produced a search result(s) associated with a keyword(s) and/or category(ies) of a query which was provided by a search engine(s) indicated in a search monitor record he or she may be less or more likely to be selected to respond to a query or search request. In at least one embodiment a searcher who has produced a search result(s) presented to a user using the process 1300 (FIG. 13) may be selected to respond to a query associated with a search monitor. Any information included in the database 120 (FIG. 1) may be used to determine a rating of a searcher based on a search monitor associated with a query. Any process for rating a searcher using information of a search monitor(s) may be used within the scope of this disclosure. Control is passed to operation 1420 and process 1400 continues.

In operation 1420 a searcher(s) associated with a query are sorted. The sort operation in operation 1420 may be based on rating information determined in operation 1410 and/or operation 1415 and/or other information included in the database 120 (FIG. 1). For example, if a searcher(s) or guide is ranked first or second according to rating information in operation 1410 and is ranked first according to rating information in operation 1415 a guide may be ranked first, or rating information from operation 1410 may be averaged with rating information in operation 1415 and a searcher(s) may be ranked based on a resulting rating(s). In at least one embodiment, a ranking from operation 1410 is not used and a ranking from operation 1415 is used to sort a guide(s). Any ranking process based on information from operation 1410 and/or 1415 may be used within the scope of this disclosure. Control is passed to operation 1425 and process 1400 continues.

In operation 1425 a searcher(s) or guide(s) is selected to respond to a search request. The selection may be based at least in part on an order determined by the sorting performed in operation 1420, and/or other information included in the database 120 (FIG. 1). In at least one embodiment, a search request may be offered to a searcher(s) in an order determined by the sort in operation 1420 and a guide may be allowed a time period (e.g., 15 seconds) in which to respond. Alternately, any guide(s) with a ranking greater than a pre-determined value (e.g., the top three guides) may be offered an opportunity to respond to a query. Information such as availability (i.e., a guide being logged-in), membership in an affiliate group, membership in a list of preferred searchers associated with a user, and/or any other information indicated in the database 120 may be used to select a searcher. Any selection criteria may be used within the scope of the embodiments disclosed herein. Control is passed to operation 1405 and process 1400 continues.

Figure 15A:
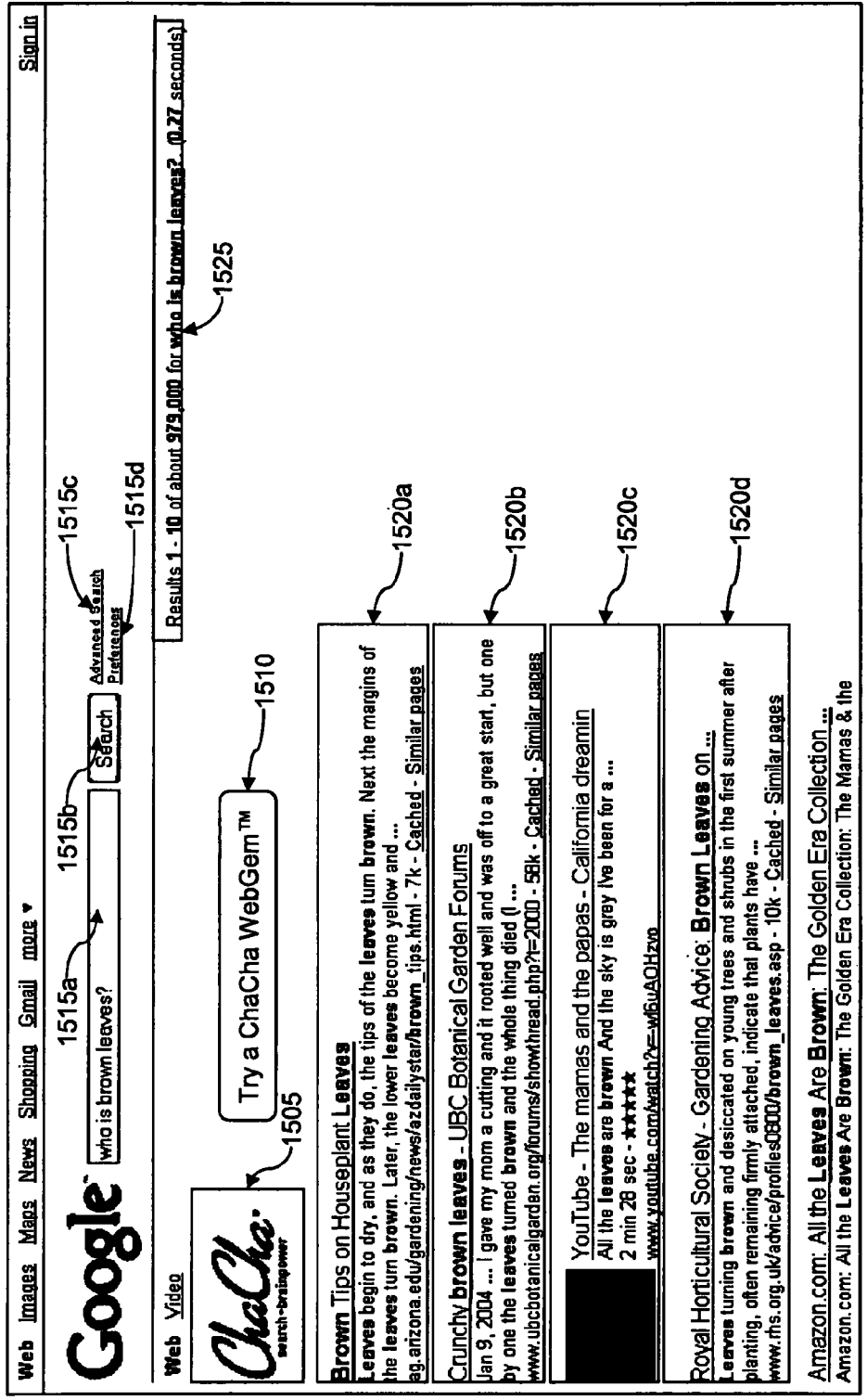

A GUI 1500 whereby a user may be notified of a search result(s) and/or a searcher is illustrated in FIG. 15A. Information obtained using the GUI 1500 may be used to determine if a user elects to view a search result(s) provided by the alternate search system 130 (FIG. 1).

The GUI 1500 may include an advertising window 1505, an action button 1510, primary search engine controls 1515, primary search engine result indicators 1520, and a primary search engine result table 1525.

The advertising window 1505 may present an advertisement(s) selected by the alternate search system 130. The selection of an advertisement may be related to any information which is indicated in the database 120. More than one advertising window 1505 may be included in the GUI 1500 (FIG. 15A). In at least one embodiment, the advertising window 1505 may include an incentive for a user to view a search result(s) provided by the alternate search system 130 (FIG. 1).

The 'Try a ChaCha WebGem™' action button 1510 may indicate information regarding a search result(s) and/or a searcher(s) (or guide(s)) selected by the alternate search system 130. The 'Try a ChaCha WebGem™' action button 1510 may be used to view a search result(s) provided by the alternate search system 130 (FIG. 1). Information may displayed using the action button 1510 (FIG. 15A) based upon any information indicated in the database 120 and/or the user system 135. For example, instead of providing a user the option to view a search result(s) a user may be provided an option to submit a query to a guide(s) who may notify a user if a search result is obtained responsive to the query. While only a single action button 1510 is provided in the GUI 1500, multiple action buttons 1510 may be provided. Activation of the action button 1510 may cause the GUI 1550 illustrated in FIG. 15B to be provided.

The primary search engine controls 1515 may be used to submit a search request to a search system such as the primary search system 160 (FIG. 1). The primary search engine controls 1515 may include a query box 1515*a*, a 'Search' button 1515*b*, an 'Advanced Search' control 1515*c*, and a 'Preferences' control 1515*d*. The query box 1515*a* may be used to indicate a query. The 'Advanced Search' control 1515*c* may be used to select a more complex search selection interface. The 'Preferences' control 1515*d* may be used to provide a GUI to select preferences for search activities associated with a primary search system. The 'Search' button 1515*b* may be used to submit a query indicated in the query box 1515*a* to the primary search system 160.

The primary search engine result indicators 1520 may indicate information of and/or provide action controls associated with a search result(s) provided by, for example, the primary search system 160. The primary search engine result indicator 1520a provides information associated with the result 'Brown Tips on Houseplant Leaves'. The primary search engine result indicator 1520b provides information associated with the result 'Crunchy brown leaves—UBC Botanical Garden Forums'. The primary search engine result indicator 1520c provides information associated with the result 'You-Tube—The mamas and the papas—California dreamin'. The primary search engine result indicator 1520d provides information associated with the result 'Royal Horticultural Society—Gardening Advice: Brown Leaves on . . .'

The primary search engine result table 1525 may present information of a search result(s) provided by the primary search engine 160 (FIG. 1). For example, information of a number of search results provided by a primary search engine may be provided. A feature(s) associated with the primary search engine result table 1525 may be used by the search monitor 155 (FIG. 1) to determine where a features(s) associated with the advertising window 1505 and the action button 1510 may be inserted into the content of a page displayed by an application such as the application 150 as described further herein below.

A GUI 1550 whereby a user may be presented with information associated with a search result(s) and/or a searcher(s) is illustrated in FIG. 15B. The information obtained using the GUI 1550 may be used to determine if a user elects to review a search result(s) provided by the alternate search system 130 (FIG. 1) and/or to communicate with a searcher(s) or guide (s).

The GUI 1550 includes an alternate result window 1555, a query box 1560, an unguided search action button 1565, a guided search action button 1570, and a guide indicator 1575.

The alternate result indicator 1555 may be used to provide information of one or more search results which have been selected by the alternate search system 130 (FIG. 1). As illustrated in FIG. 15B, information associated with the search result 'http://www.brownleaves.jp' is presented in the alternate result indicator 1555. A user may elect to view further details of an alternate search result(s) by for example clicking on the alternate result hyperlink 1557 associated with a result. Various types of controls which are well known in the art may be used to implement the alternate result indicator 1555. Activation of the alternate result hyperlink 1577 may cause the GUI 1600 to be provided.

The query box 1560 may be used to provide information of a search query. Using the example illustrated in FIG. 15B, the query 'Who is Brown Leaves?' may have been submitted to a search engine, such as the primary search system 160 (FIG. 1). The unguided search action button 1565 (FIG. 15B) may be used to submit a search query indicated in the query box 1560 for a search which does not utilize the assistance of a guide.

The guided search action button 1570 may be used to submit a search query indicated in the query box 1560 for a search utilizing the assistance of a guide. The guide indicator 1575 may be used to provide information of guides available to respond to a search query and/or a category(ies) or keyword (s) associated with a search query.

Figure 15C:
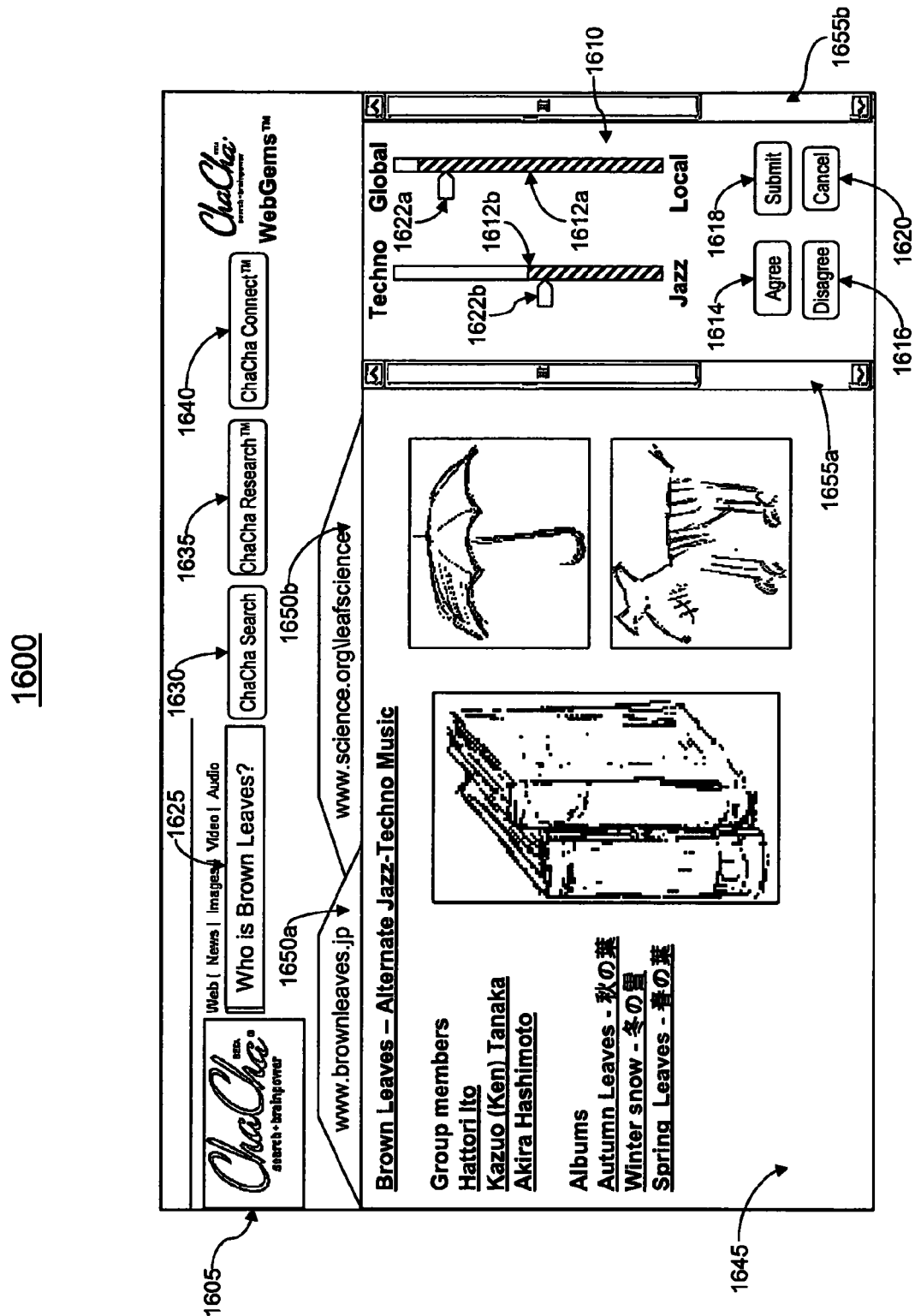

A GUI 1600 whereby a user may be provided with information of a search result(s) and/or may provide information regarding a search result(s) is illustrated in FIG. 15C. The information obtained using the GUI 1600 may be used to determine relevance of a search result(s) provided by the alternate search system 130 (FIG. 1).

The GUI 1600 includes an advertising window 1605, a rating control window 1610, slider bars 1612, slide arrows 1622, an 'Agree' button 1614, a 'Disagree' button 1616, a 'Submit' button 1618, a 'Cancel' button 1620, a search query box 1625, an unguided search button 1630, a research guided search button 1635, a live guided search button 1640, a result display window 1645, and selection tabs 1650.

The advertising window 1605 may be used to provide information of advertisements selected by the alternate search system 130. The selection of an advertisement may be related to any information which is indicated in the database 120 (FIG. 1). More than one advertising window 1605 may be included in the GUI 1600. In at least one embodiment, the advertising window 1605 may include an incentive for a user to utilize a service(s) of the alternate search system 130. In at least one embodiment, an advertisement(s) selected by a guide(s) may be presented in the advertising window 1605.

The controls provided in the rating control window 1610 may be used to indicate user preferences regarding a search result(s) presented in the result display window 1645. The rating control window 1610 may include the slider bars 1612 and the slide arrows 1622. The slider bars 1612 may indicate a system determination of a rating of a search result. The slide arrows 1622 may be used to indicate a user opinion regarding a rating of a search result. The slider bar 1612a indicates that the search system considers the search result indicated in the result display window 1645 to be more 'Global' and less 'Local'. The slider bar 1612b indicates that the search system considers the search result indicated in the result display window 1645 to be equally 'Techno' and 'Jazz'. The slide arrow 1622a indicates that the user considers the search result indicated in the result display window 1645 to be less 'Global' than the search system, and the slide arrow 1622b indicates that the user considers the search result indicated in the result display window 1645 to be less 'Techno' than the search system.

The 'Agree' button 1614 may be used to indicate that a search result is correctly characterized by the slide bars 1612. The 'Disagree' button 1616 may be used to indicate that a search result is not correctly characterized by the slide bars 1612. The 'Submit' button 1618 may be used to record opinions provided using the slide arrows 1622. The 'Cancel' button 1620 may be used to discard opinions provided using the slide arrows 1622.

While the rating controls have been illustrated using slide bars, indicator arrows and action buttons, and a limited number of controls and specific parameters, any number of controls, and other types of interface controls which are well known in the art may be used to obtain rating information regarding a search result(s) within the spirit and scope of the embodiments herein.

The search query box 1625 may be used to provide information of a query. The search query box 1625 may indicate any information associated with a query, such as a categorization, a profile and/or other information which may be associated with a query.

The unguided search button 1630 may be used to submit information indicated in the search query box 1625 for a search which does not utilize the assistance of a human guide.

The research guided search button 1635 may be used to submit information indicated in the search query box 1625 for a search by a human searcher(s) which does not request a live, interactive search session. Such a search may allow a user to receive a search result(s) which may be produced by a human searcher which may be provided at a later time. A notification may be sent to a user if such a result is provided. For example, an SMS, EMS or MMS message, an email message, an instant message (IM), an indication using the search monitor 155

(FIG. 1) and/or any notification method which may utilize a communication service(s) associated with a user may be utilized.

The live guided search button 1640 may be used to submit information indicated in the search query box 1625 for a search which requests a live, interactive search session with a human searcher. Such a session may allow a user to receive a search result(s) which may be produced by a human searcher in a live, interactive session.

The result display window 1645 displays information of a search result(s). In at least one embodiment, the search result indicated in the result display window 1645 is a result(s) indicated to a user by the search monitor 155 (FIG. 1). Using the example illustrated in FIG. 15C, information related to the search result 'www.brownleaves.jp' is presented in the result display window 1645. The navigation controls 1655a may be used to navigate within the content of the result display window 1645. The navigation controls 1655b may be used to navigate within the content of the rating control window 1610.

The selection tabs 1650 may be used to select to view information of a search result(s). Using the example illustrated in FIG. 15C, the selection tab 1650a may allow a user to view information related to the search result 'www.brownleaves.jp' and the selection tab 1650b may allow a user to view information associated with the search result 'www.science.org\leafscience'. Information of any or all search results indicated by the search monitor 155 (FIG. 1) may be made available for review using the selection tabs 1650.

Figure 16:
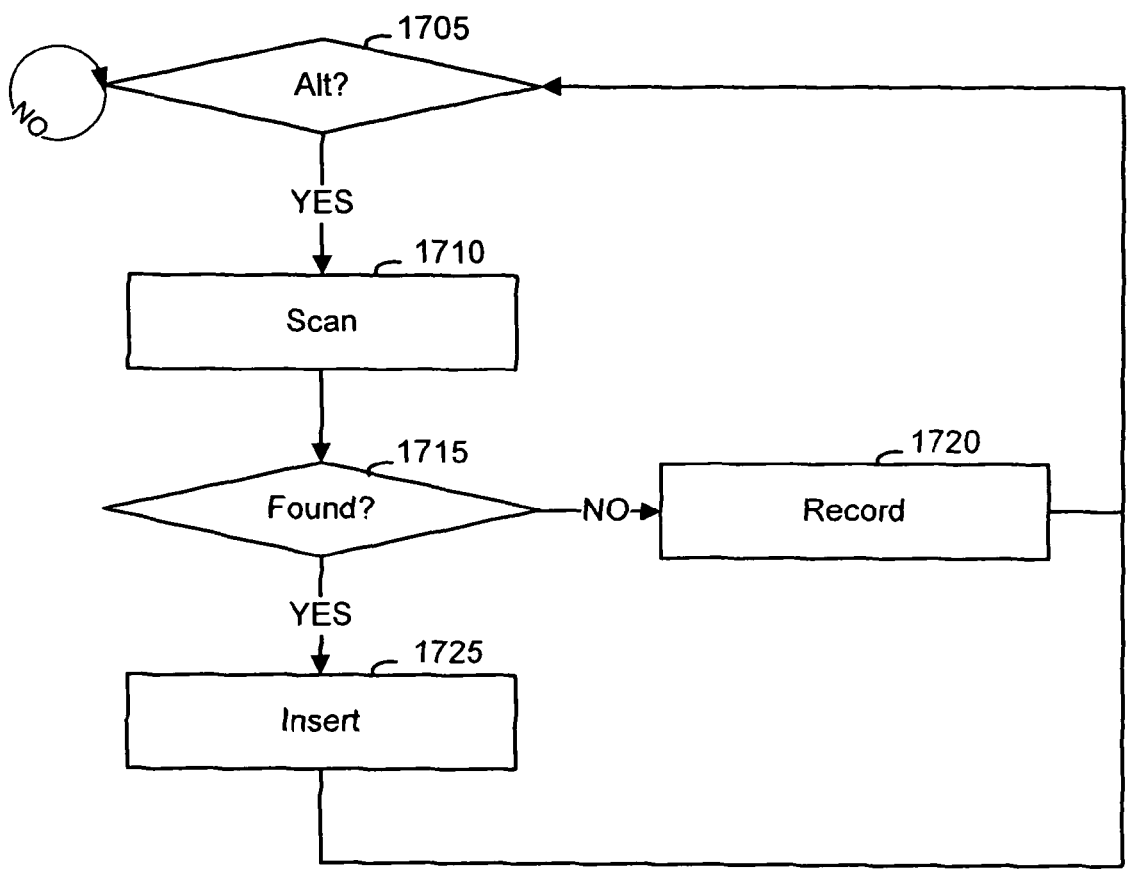
FIG. 16 is a flow diagram of a process for presenting a notification to a user.

As illustrated in FIG. 16, a process 1700 of inserting a notification such as the advertising window 1505 (FIG. 15A) and The 'Try a ChaCha WebGem™' action button 1510 described with respect to FIG. 15A in a web page is provided. The process 1700 may be operative on the user system 135. For example, the search monitor 155 (FIG. 1) may operate on information in the application 150, which may be for example a browser.

In operation 1705 a determination is made as to whether an alternate ("alt") search result is detected. If in operation 1705 it is determined that an alternate result is not detected, control remains at operation 1705 and process 1700 continues. If in operation 1705 it is determined that an alternate search result is detected, control is passed to operation 1710 and process 1700 continues.

In operation 1710 a message returned by for example the primary search system 160 (FIG. 1) is analyzed or scanned to locate a feature within the information which may allow the hypertext and/or other information associated with a notification mechanism to be inserted into the information. In at least one embodiment, the search monitor 155 (FIG. 1) which may be an extension to a browser may scan a web page prior to presenting such information to the application program 150. Control is passed to operation 1715 and process 1700 continues.

In operation 1715 a determination is made as to whether a feature is located in a message such as a web page returned for example by a search system, such as the primary search system 160 (FIG. 1). If in operation 1715 it is determined that a feature is not found, control is passed to operation 1720 and process 1700 continues. If in operation 1715 it is determined that a feature is found, control is passed to operation 1725 and process 1700 continues.

The determination in operation 1715 may be based on various criteria. In at least one embodiment, a hypertext element is identified which is to be located in a web page. If such an element is located based on analysis of a web page, it is determined that a feature is found. Alternately more than one element and/or a combination of elements may be identified which may be found in a web page and/or other information provided to the user system 135 (FIG. 1). For example an element(s) may be located based on information associated with a search query, etc. Any information included in a message received by a user system may be examined to determine whether a feature is found.

In operation 1720 information regarding the scanning process is recorded. A message(s) may be transmitted. For example a message may be sent to the alternate search system 130 (FIG. 1). A message(s) may include information to indicate that a feature was not located in a web page such as a web page returned by the primary search system 160. For example, if a search monitor detects a transmitted message which is associated with a search system, and a response message does not include an expected feature, the search monitor may transmit a message to the alternate search system 130 to indicate that an unexpected event has occurred. A transmitted message(s) may include any or all content of a messages received by the user system 135. A message(s) may be received. For example a message(s) may be received from the alternate search system 130. A message(s) received may include information which may alter a criteria used to determine if a feature is found. For example a feature(s) which may be found to insert a notification element may be included in a message(s) received. A search monitor log and the database 120 are updated. Control is passed to operation 1705 and process 1700 continues.

In operation 1725 a notification is added to an interface. For example an element may be inserted into a web page such as a web page returned by the alternate search system 160 (FIG. 1) as described further herein with respect to FIG. 17. A message(s) may be transmitted. For example a message(s) may be transmitted to the alternate search system 130 (FIG. 1), which may indicate information of a primary search system such as the primary search system 160, and/or the user system 135. A message(s) may be received. For example a message(s) may be received from the alternate search system 130. A message(s) received from the alternate search system 130 may indicate a change(s) in the behavior of the search monitor 155. A search monitor log and the database 120 are updated. Control is passed to operation 1705 (FIG. 16) and process 1700 continues.

As illustrated in FIG. 17, a web page may be composed of hypertext mark-up language (HTML) elements which may include various features. A web page may include any elements defined in a standard such as the HTML 4.0 standard published by the W3C consortium. A web page may include active elements such as a Java® applet(s). A simplified web page is used for the purposes of illustration.

An alternate search result notification 1840 may include a HTML element(s) which defines the content and behavior of a search result notification. Using the example illustrated in FIG. 18, an element(s) may be inserted in a web page based on detecting a HTML element such as a '<div>' tag. The start of a script element is indicated by the '<script>' tag 1805. The end of a script element is indicated by the '</script>' tag 1810. Likewise a table element begins with the '<table>' tag 1815 and ends with the '</table>' tag 1820. Such an element may for example be rendered by an application such as a browser as the primary search engine results indicator table 1525 (FIG. 15A). Likewise a division element may begin with the <div> tag 1825 and end with the </div> tag 1830. Such an element may for example be rendered as the primary search engine result indicator 1530 (FIG. 15A). As the '<div id=res>' tag 1835 is unique within the HTML illustrated in FIG. 18, it may be used to determine a point at which an HTML element such as the alternate search result indicator 1840 may be inserted into a web page described by HTML which is received from a source such as the primary search system 160 (FIG. 1). This may for example cause the advertising window 1505 (FIG. 15A) and the action button 1510 to be rendered in a browser application.

While insertion of an alternate search result indicator has been described with reference to a specific example of HTML elements, no limitation is implied thereby. Any element(s) may be used to render an alternate search result indicator, and any element(s) may be utilized to determine the insertion point for an alternate search result indicator to be edited into a web page within the scope of the embodiments herein. Any version of a generalized mark-up language (GML) such as XHMTL 1.0, HTML 4.x, etc. may be utilized within the scope of the embodiments herein.

Figure 18:
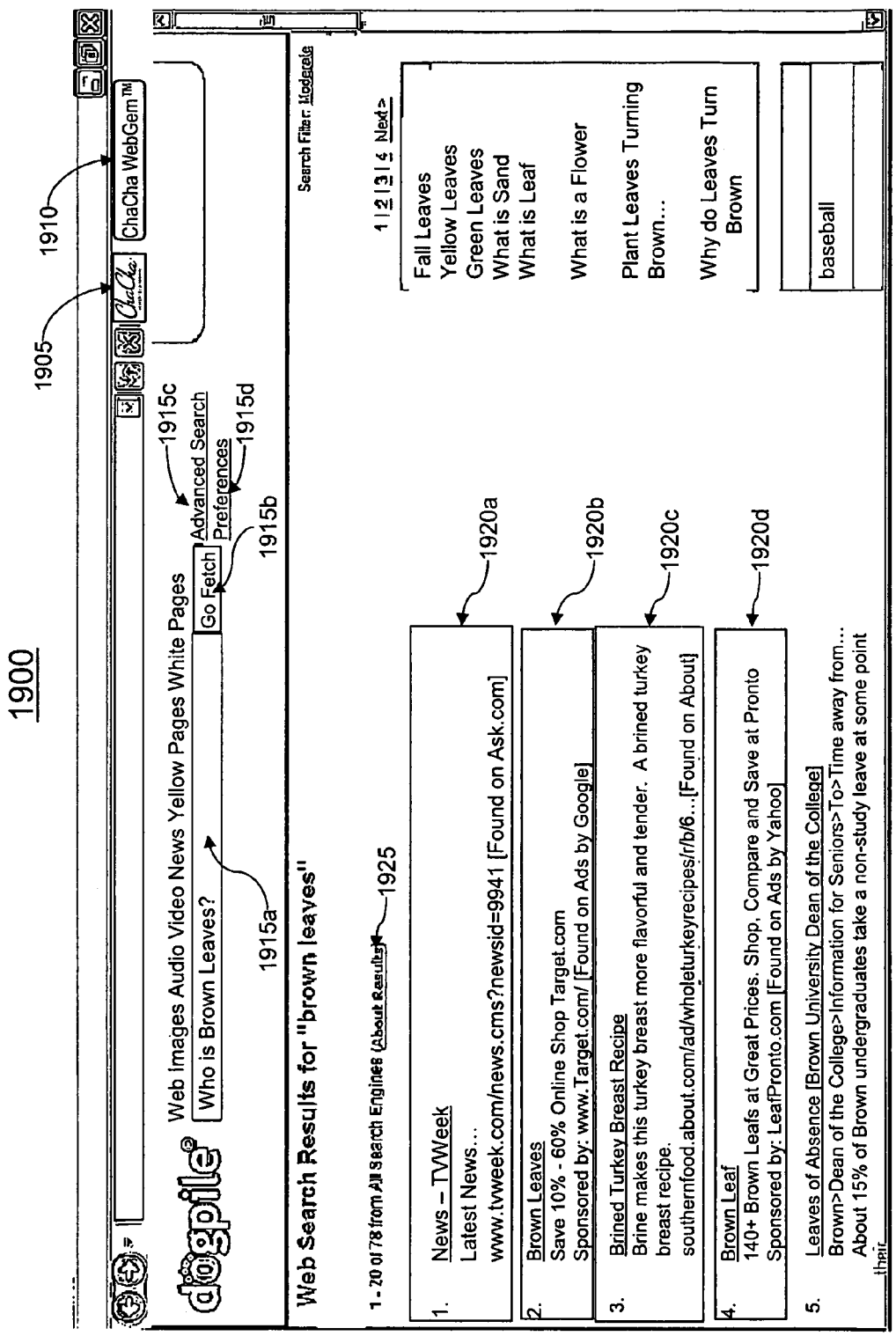
FIG. 18 illustrates an exemplary GUI for notification of a user.
Figure 19:
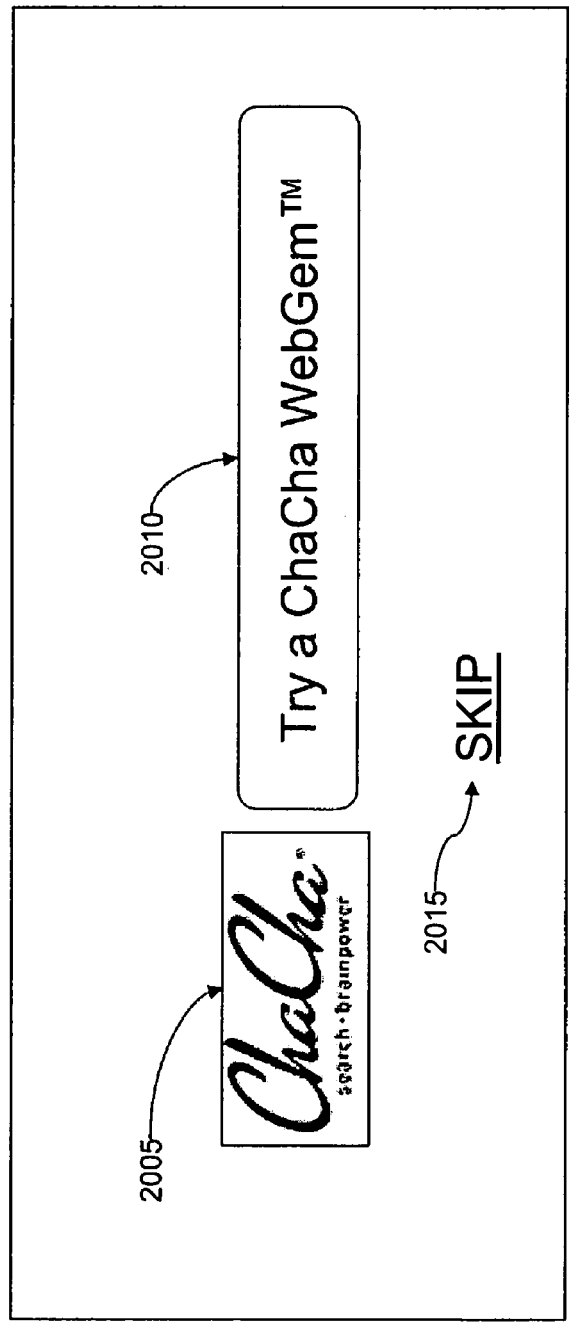
FIG. 19 illustrates an exemplary GUI for notification of a user.

In other embodiments, a notification may be provided to a user by other mechanisms than insertion of information into a web page. In at least one embodiment, a notification may be provided by presenting a notification button in the margin of an application such as a browser as illustrated in FIG. 18, or may be provided in a notification area such as the 'system tray' in a Windows® environment. In other embodiments, a notification may be provided using a 'pop-up' window, or an interstitial page as illustrated in FIG. 19. For example, if the search monitor 155 is a service, an indication may be provided as a notification 'pop-up' if a search result is obtained by a searcher responsive to a search request.

A GUI 1900 whereby a user may be notified of a search result(s) and/or a searcher is illustrated in FIG. 18. Information obtained using the GUI 1900 may be used to determine if a user elects to view a search result(s) provided by the alternate search system 130 (FIG. 1).

The GUI 1900 includes an advertising window 1905, an action button 1910, primary search engine controls 1915, primary search engine result indicators 1920, and a primary search engine result table 1925.

The advertising window 1905 may present an advertisement(s) selected by the alternate search system 130. The selection of an advertisement may be related to any information which is indicated in the database 120 (FIG. 1). More than one advertising window 1905 may be included in the GUI 1900 (FIG. 18). In at least one embodiment, the advertising window 1905 may include an incentive for a user to view a result(s) produced by the alternate search system 130 (FIG. 1). In at least one embodiment, the advertising window 1905 may be omitted.

The action button 1910 may be used to take actions with respect to information obtained using the GUI 1900. The action button 1910 may be used to indicate information regarding a search result(s) and/or a guide(s) selected by the alternate search system 130 (FIG. 1). Using the example illustrated in FIG. 18, the 'ChaCha WebGem™' action button 1910 may be used to view information of a search result(s) provided by the alternate search system 130 (FIG. 1). Different information may displayed using the action button 1910 (FIG. 18) based upon any information indicated in the database 120 and/or the user system 135. For example, instead of offering a user the option to view a search result(s) a user may be offered an option to submit a query to a guide(s) who may notify a user if a search result is provided responsive to the query. While only a single action button 1910 is depicted in the GUI 1900, multiple action buttons 1910 may be provided to a user. For example, an action button 1910 to search with a guide, and an action button 1910 to view a search result(s) may be provided. Activation of the action button 1910 may cause a GUI such as the GUI 1550 illustrated in FIG. 15B to be provided to a user.

The primary search engine controls 1915 may be utilized to submit a search request to a search system such as the primary search system 160 (FIG. 1). The primary search engine controls 1915 may include a query box 1915a, a 'Go Fetch' button 1915b, an 'Advanced Search' control 1915c, and a 'Preferences' control 1915d. The query box 1915a may be used to indicate a query. The 'Advanced Search' control 1915c may be used to select a more complex search selection interface. The 'Preferences' control 1915d may be used to provide a GUI to select preferences for search activities associated with a primary search system. The 'Go Fetch' button 1915b may be used to submit a query indicated in the query box 1915a to the primary search system 160.

The primary search engine results indicators 1920 may indicate information of and/or provide action controls associated with a search result(s) provided by, for example, the primary search system 160. The primary search engine result indicator 1920a provides information associated with the result 'News—TVWeek'. The primary search engine result indicator 1920b provides information associated with the result 'Brown Leaves'. The primary search engine result indicator 1920c provides information associated with the result 'Brined Turkey Breast Recipe'. The primary search engine result indicator 1920d provides information associated with the result 'Brown Leaf'. The primary search engine result table 1925 may present information of a result(s) provided by the primary search engine 160 (FIG. 1).

A GUI whereby a user may be notified of a search result(s) and/or a searcher is illustrated in FIG. 19. The information obtained using the GUI 2000 may be used to determine if a user elects to view a search result(s) provided by the alternate search system 130 (FIG. 1). The GUI 2000 may be presented in a separate window or 'pop-up', or may be an interstitial window.

The GUI 2000 includes an advertising window 2005, an action button 2010, and a skip button 2015. The advertising window 2005 may present an advertisement(s) selected by the alternate search system 130. The selection of an advertisement may be related to any information which is indicated in the database 120 (FIG. 1). More than one advertising window 2005 may be included in the GUI 2000 (FIG. 19). In at least one embodiment, the advertising window 2005 may include an incentive for a user to view a result(s) produced by the alternate search system 130 (FIG. 1). In at least one embodiment, the advertising window 2005 may be omitted.

The action button 2010 may be used to take actions with respect to information obtained using the GUI 2000. The action button 2010 may be used to indicate information regarding a search result(s) and/or a guide(s) selected by the alternate search system 130 (FIG. 1). Using the example illustrated in FIG. 19, the 'Try a ChaCha WebGem™' action button 2010 allows a user to indicate the intent to view a search result(s) provided by the alternate search system 130 (FIG. 1). Different information may displayed using the action button 2010 (FIG. 19) based upon any information indicated in the database 120 and/or the user system 135. For example, instead of offering a user the option to view a result a user may be offered an option to submit a query to a guide(s) who may notify a user if a search result is provided responsive to the query. While only a single action button 2010 is depicted in the GUI 2000, multiple action buttons 2010 may be provided to a user. For example, a button to search with a guide, and a button to view search results may be provided.

Activation of the action button 2010 may cause a GUI such as the GUI 1550 illustrated in FIG. 15B to be provided.

The skip button 2015 allows a user to suppress the information provided in the GUI 2000. In at least one embodiment, activation of the skip button 2015 may close the window associated with the GUI 2000.

The search monitor 155 (FIG. 1) may be implemented using any suitable programming language. Environments for languages such as C++, Delphi, Java, Python and .NET may be used to implement an extension which may function as the search monitor 155. An environment such as Microsoft Visual Studio or Borland Delphi might be used to develop a service which may function as the search monitor 155.

Using the methods and system described herein the services of a human-assisted search system may be promoted. If an alternative search result(s) is identified responsive to a search query submitted to a primary search system, a user may be notified that such a search result(s) is available. A search result(s) selected by an alternate search system may be compared to a search result(s) provided by a number of other search systems to determine whether an alternate search result is available associated with a query. A 'search monitor' which may be implemented as an extension, an application and/or a service may provide a notification to a user in order that the user is aware of an alternate search result(s). A search monitor may be installed and may provide information of a user.

A search monitor may provide a notification in any suitable way. A notification may be presented within a web page which incorporates information of a search result(s) provided by a primary search system. A notification may be provided using information located outside the main window of an extended application. A notification may be provided using a separate frame or 'pop-up'. A notification may be provided using any communication system(s) associated with a user. If an alternate search result for a query is not available, a guide may be selected to provide a search result(s) responsive to the query.

Condition(s) for providing a notification to a user may be modified based on user actions, content of a search request, historical information, and/or other information indicated in a search database. Action(s) of a search monitor may be modified at any time via a message(s) and/or other information.

The many features and advantages of the claimed invention are apparent from the detailed specification and, thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A method, comprising:
    receiving a search request;
    determining, by a processor, whether a search result obtained by a first human assistant responsive to a query assigned to the first human assistant is available;
    selecting the search result of the first human assistant based on a match of a keyword of the search request to the query;
    obtaining a response from an automated search engine determined based on a rating of the automated search engine;
    rating the automated search engine based on a comparison of responses of the automated search engine to search results obtained by human assistants;
    providing an indication of human assistance to a source of the search request when the search result of the first human assistant is returned and the search result of the first human assistant is superior to the response of the automated search engine for the search request; and
    directing the search request to a second human assistant when the search result of the first human assistant is not superior to the response of the automated search engine.

2. The method of claim 1, wherein the first human assistant performs a search responsive to the query to obtain the search result of the first human assistant and the search result of the first human assistant is found to be superior based on a ranking of the first human assistant and the rating of the automated search engine which provided the response.

3. The method of claim 2, wherein the search result of the first human assistant is returned via a browser.

4. The method of claim 1, wherein the search result of the first human assistant is determined to be superior based on a comparison of the response of the automated search engine to the search result of the first human assistant and a rank of the first human assistant.

5. The method of claim 1, wherein the indication is provided when determining that a user submitting the search request has not previously declined to view a second search result of the human assistants.

6. The method of claim 1, wherein a third human assistant receives the search result of the first human assistant, the search request, and the response and the search result of the first human assistant is found to be superior based on an action of the third human assistant.

7. The method of claim 1, wherein the indication is not provided when determining that the source of the search request has declined the indication a predetermined number of times.

8. The method of claim 1, wherein the indication includes an identifier of the first human assistant.

9. The method of claim 1, comprising:
    determining that the search result of the first human assistant is not superior when the search result of the first human assistant matches the response of the automated search engine.

10. The method of claim 1, comprising: determining the search result of the first human assistant is superior based on historical information of a user.

11. The method of claim 1, wherein the search request is received from a service.

12. The method of claim 1, wherein the indication is provided based on a ranking of the first human assistant for the search request.

13. An apparatus, comprising:
    a user computing device submitting a search request; and
    a search system comprising a processor and a memory determining whether a search result obtained by a first human assistant is available, obtaining the search result from the first human assistant in response to a query directed to the first human assistant, selecting the search result of the first human assistant based on a comparison of the query to the search request, obtaining a response from an automated search engine determined based on a rating of the automated search engine, rating the automated search engine based on a comparison of responses of the automated search engine to search results obtained by human assistants, providing an indication of human assistance via the user computing device when the search result of the first human assistant is returned and the search result of the first human assistant is superior to the response of the automated search engine for the search request and directing the search request to a second human assistant when the search result of the first human assistant is not superior to the response of the automated search engine.

14. A method of promoting a search service, comprising:
determining whether a search result matching a search request is available;
determining whether the search result is based on a search performed by a first human assistant responsive to a query assigned to the first human assistant;
selecting, by a processor, the search result of the first human assistant based on a keyword of the search request and the query associated with the search performed by the first human assistant; and
obtaining a response from an automated search engine determined based on a rating of the automated search engine;
rating the automated search engine based on a comparison of responses of the automated search engine to search results obtained by human assistants;
inserting an indication that the search result is based on a search performed by the first human assistant within information provided to a source of the request when the search result of the first human assistant is superior to the response of the automated search engine for the search request; and
directing the search request to a second human assistant when the search result of the first human assistant is not superior to the response of the automated search engine.

15. The method of claim 14, wherein the search result of the first human assistant is obtained from an application separate from a browser providing the information.

16. The method of claim 14, wherein the search result of the first human assistant is ranked highest among the search results obtained from the human assistants.

17. The method of claim 16, wherein the search result of the first human assistant is ranked highest based on a review by the human assistants registered to perform searches on behalf of users submitting requests associated with a category of the search request.

18. The method of claim 14, comprising:
obtaining an answer of the second human assistant and determining whether the answer of the second human assistant is provided responsive to the search request based on a rank of the second human assistant.

19. The method of claim 14, wherein the indication is an identifier of the first human assistant.

20. A non-transitory computer readable storage medium storing therein a program for causing a computer to execute an operation including promoting a search service, comprising:
determining whether a search result of a first human assistant related to a search request is available responsive to detection of receipt of the search request;
selecting the search result of the first human assistant based on a keyword of a query linked to the search result;
providing the query to the first human assistant;
receiving the search result from the first human assistant responsive to the query;
obtaining a response from an automated search engine determined based on a rating of the automated search engine;
rating the automated search engine based on a comparison of responses of the automated search engine to search results obtained by human assistants;
inserting an indication of human assistance within information including the response by the automated search engine responsive to the search request when the search result of the first human assistant is superior to the response obtained by submitting the search request to the automated search engine; and
directing the query to a second human assistant when the search result of the first human assistant is not superior to the response of the automated search engine.

* * * * *